US012450838B2

(12) United States Patent
Bramlet et al.

(10) Patent No.: US 12,450,838 B2
(45) Date of Patent: Oct. 21, 2025

(54) GENERATING MULTIPLE RESOLUTIONS OF A VIRTUAL REALITY ENVIRONMENT

(71) Applicant: Enduvo, Inc., Peoria, IL (US)

(72) Inventors: Matthew Bramlet, Peoria, IL (US); Justin Douglas Drawz, Chicago, IL (US); Steven J. Garrou, Wilmette, IL (US); Joseph Thomas Tieu, Tulsa, OK (US); Joon Young Kim, Broomfield, CO (US); Christine Mancini Varani, Newtown, PA (US); Gary W. Grube, Barrington Hills, IL (US)

(73) Assignee: Enduvo, Inc., Peoria, IL (US)

( * ) Notice: Subject to any disclaimer, the term of this patent is extended or adjusted under 35 U.S.C. 154(b) by 504 days.

(21) Appl. No.: 17/950,841

(22) Filed: Sep. 22, 2022

(65) Prior Publication Data

US 2023/0196701 A1 Jun. 22, 2023

Related U.S. Application Data

(60) Provisional application No. 63/290,198, filed on Dec. 16, 2021.

(51) Int. Cl.
| | |
|---|---|
| *G06T 19/00* | (2011.01) |
| *A63F 13/525* | (2014.01) |
| *G06T 17/00* | (2006.01) |
| *G06T 19/20* | (2011.01) |
| *G06V 10/778* | (2022.01) |

(Continued)

(52) U.S. Cl.
CPC .......... *G06T 19/006* (2013.01); *A63F 13/525* (2014.09); *G06T 17/00* (2013.01); *G06T 19/00* (2013.01); *G06T 19/20* (2013.01); *G06V 10/7788* (2022.01); *G06V 20/20* (2022.01); *G09B 5/065* (2013.01); *G09B 7/04* (2013.01); *G09B 7/08* (2013.01); *H04N 5/265* (2013.01); *H04N 13/351* (2018.05); *G06T 2200/24* (2013.01); *G06T 2219/2016* (2013.01); *G09B 7/00* (2013.01)

(58) Field of Classification Search
None
See application file for complete search history.

(56) References Cited

U.S. PATENT DOCUMENTS

| | | |
|---|---|---|
| 6,288,753 B1 | 9/2001 | Denicola |
| 7,733,366 B2 | 6/2010 | Beavers |

(Continued)

*Primary Examiner* — Sarah Le
(74) *Attorney, Agent, or Firm* — Gary W. Grube

(57) ABSTRACT

A method executed by a computing entity includes generating a virtual reality environment utilizing a group of object representations by identifying a set of common illustrative assets and rendering the assets utilizing a first level of resolution to produce a set of common illustrative assets video frames. The method further includes selecting a subset of the set of common illustrative assets video frames to produce a common portion of video frames and rendering another representation of sets of object representations utilizing the first level of resolution to produce remaining portions of the video frames. The method further includes linking the common portion and the remaining portions to produce a first level of resolution of the virtual reality environment. The method further includes generating a second level of resolution of the virtual reality environment based on a priority asset of the set of common illustrative assets.

9 Claims, 34 Drawing Sheets

(51) Int. Cl.
     *G06V 20/20*      (2022.01)
     *G09B 5/06*      (2006.01)
     *G09B 7/04*      (2006.01)
     *G09B 7/08*      (2006.01)
     *H04N 5/265*      (2006.01)
     *H04N 13/351*      (2018.01)
     *G09B 7/00*      (2006.01)

(56) References Cited

U.S. PATENT DOCUMENTS

| | | |
|---|---|---|
| 8,682,241 B2 | 3/2014 | Huerta |
| 9,179,100 B2 | 11/2015 | Guo |
| 2011/0123972 A1 | 5/2011 | Friedman |
| 2012/0251992 A1 | 10/2012 | Huerta |
| 2013/0314421 A1 | 11/2013 | Kim |
| 2015/0206448 A1 | 7/2015 | Loudermilk |
| 2018/0232567 A1 | 8/2018 | Dolsma |
| 2020/0388183 A1* | 12/2020 | Bramlet ................ G09B 7/04 |
| 2023/0132642 A1* | 5/2023 | Sun ..................... G06T 15/20 |
| | | 345/419 |

* cited by examiner

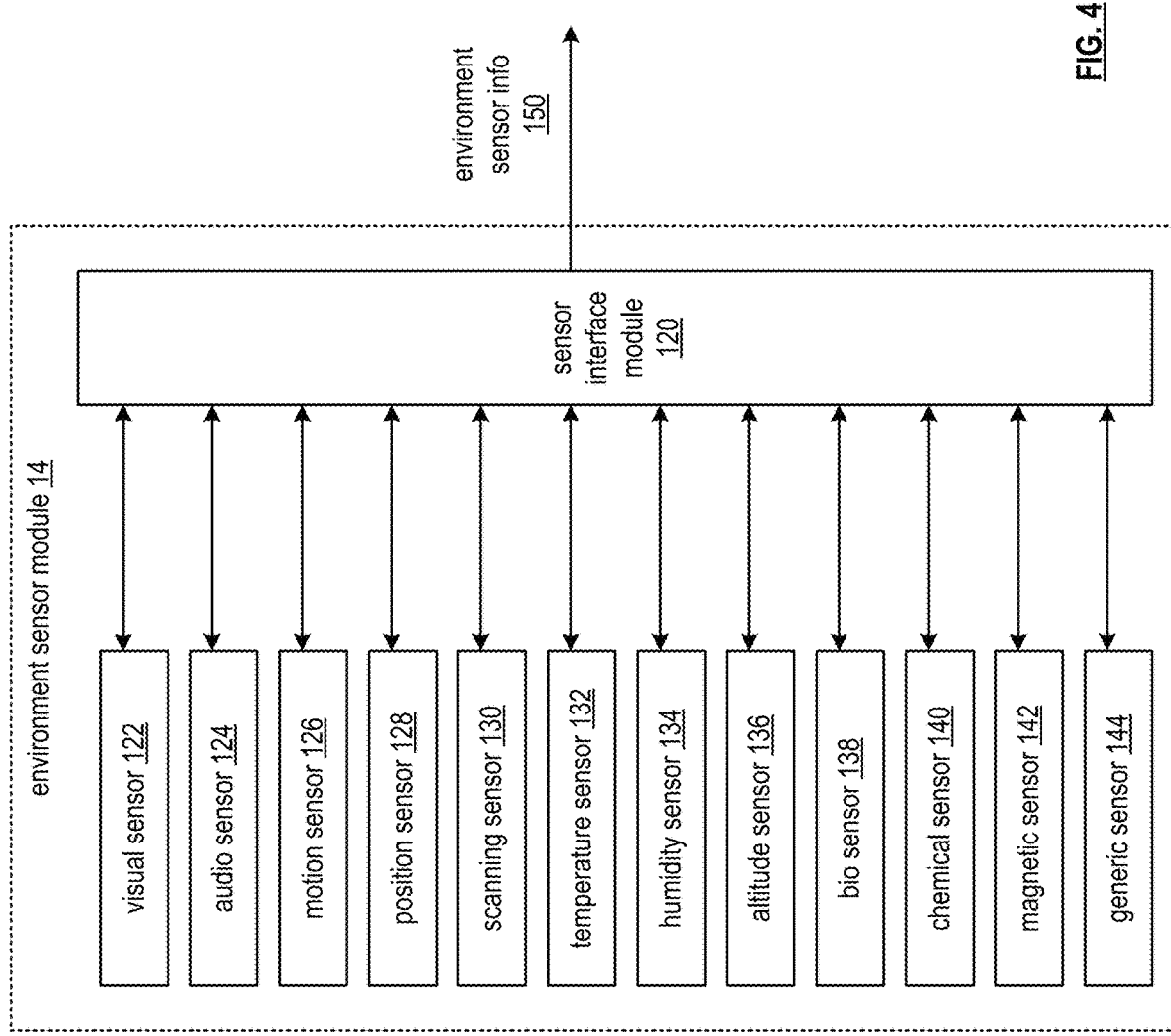

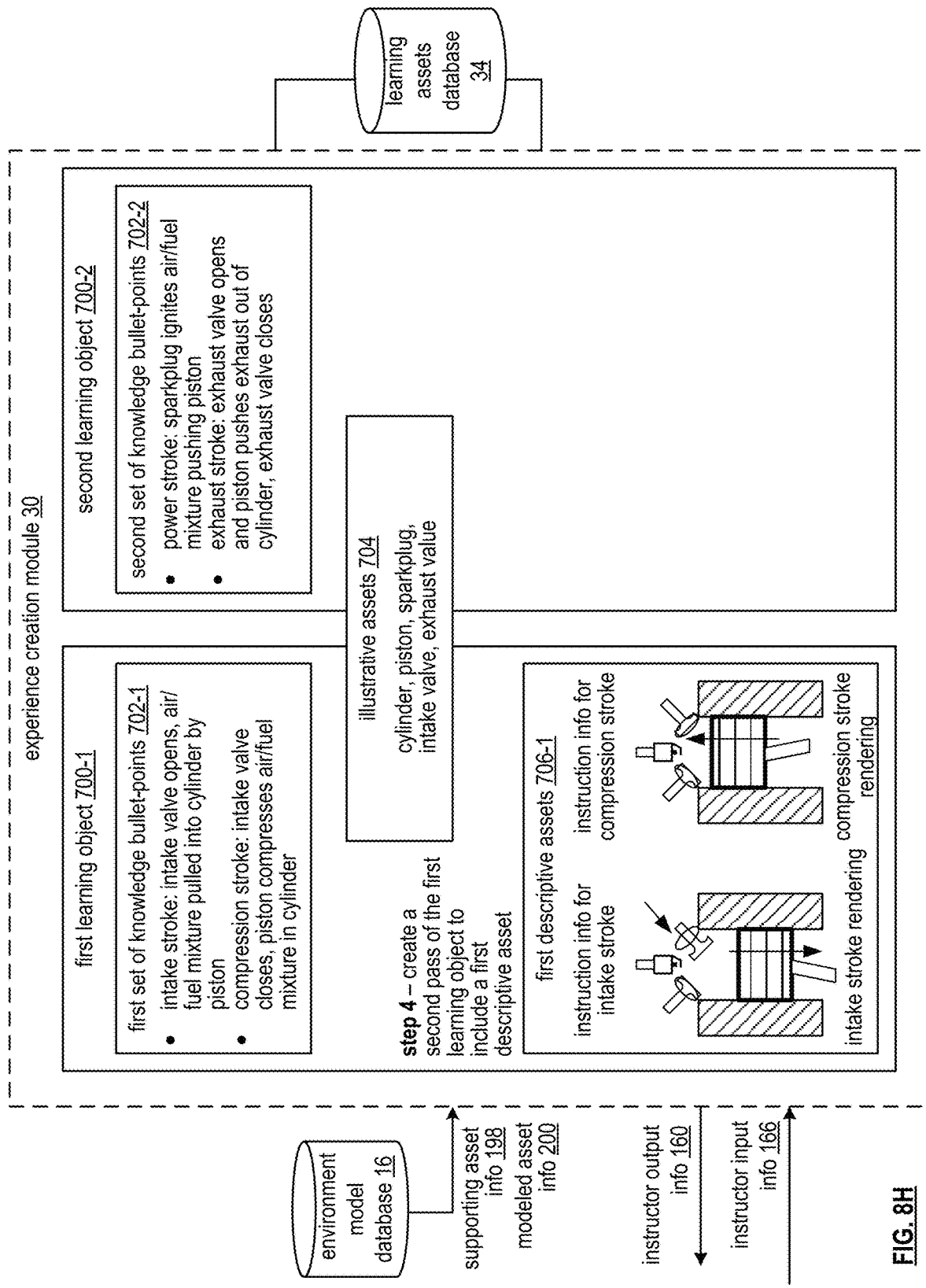

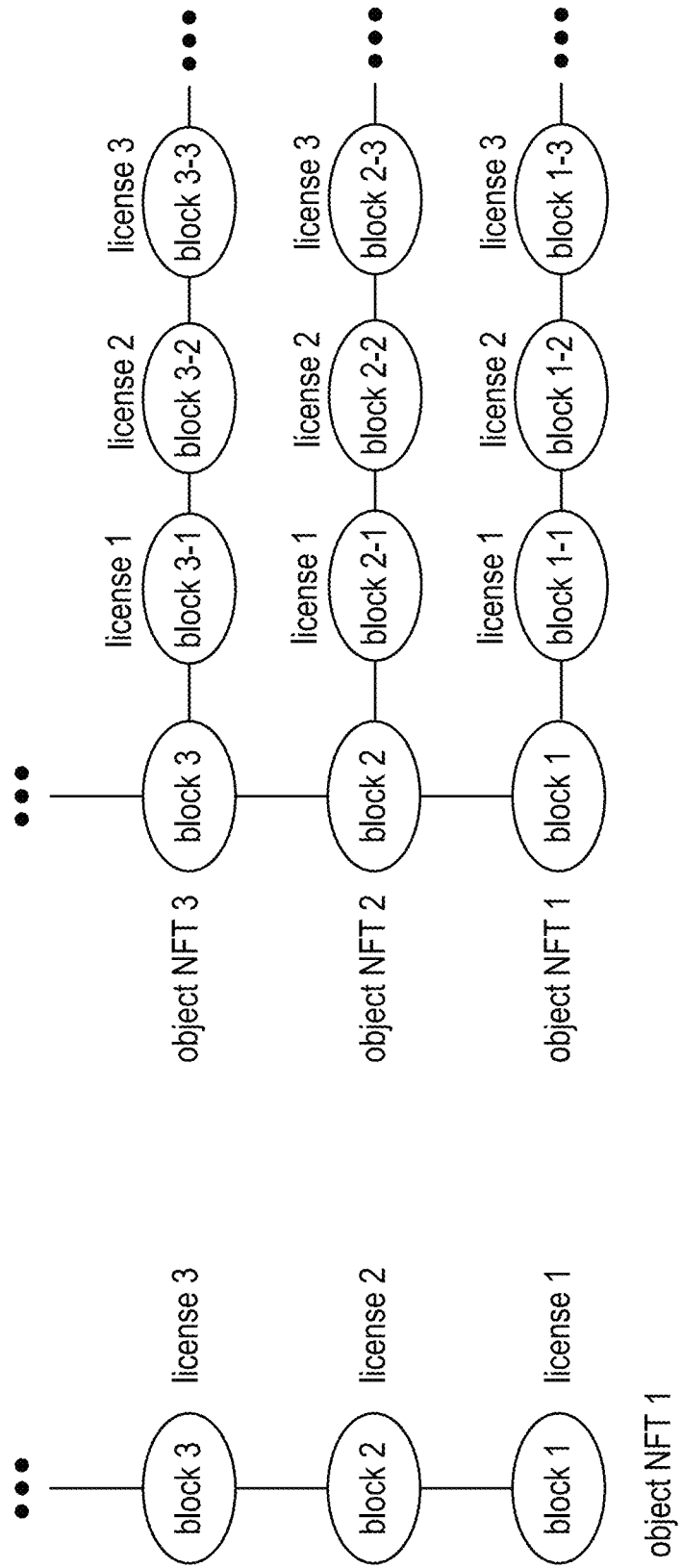

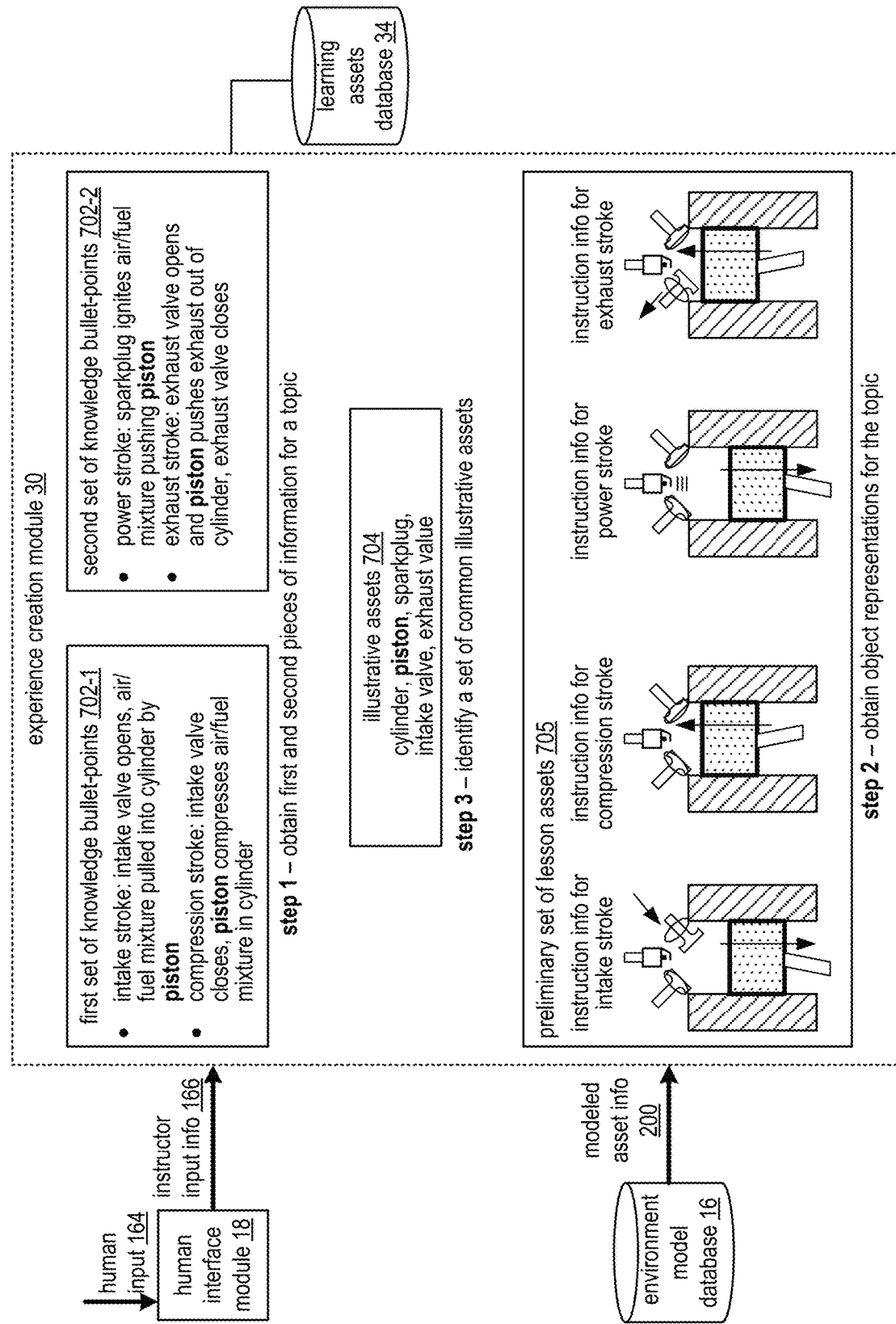

GENERATING MULTIPLE RESOLUTIONS OF A VIRTUAL REALITY ENVIRONMENT

CROSS-REFERENCE TO RELATED APPLICATIONS

The present U.S. Utility Patent application claims priority pursuant to 35 U.S.C. § 119(e) to U.S. Provisional Application No. 63/290,198, entitled "UPDATING A LESSON PACKAGE FOR A VIRTUAL ENVIRONMENT", filed Dec. 16, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer systems and more particularly to computer systems providing educational, training, and entertainment content.

Description of Related Art

Computer systems communicate data, process data, and/or store data. Such computer systems include computing devices that range from wireless smart phones, laptops, tablets, personal computers (PC), work stations, personal three-dimensional (3-D) content viewers, and video game devices, to data centers where data servers store and provide access to digital content. Some digital content is utilized to facilitate education, training, and entertainment. Examples of visual content includes electronic books, reference materials, training manuals, classroom coursework, lecture notes, research papers, images, video clips, sensor data, reports, etc.

A variety of educational systems utilize educational tools and techniques. For example, an educator delivers educational content to students via an education tool of a recorded lecture that has built-in feedback prompts (e.g., questions, verification of viewing, etc.). The educator assess a degree of understanding of the educational content and/or overall competence level of a student from responses to the feedback prompts.

BRIEF DESCRIPTION OF THE SEVERAL VIEWS OF THE DRAWING(S)

FIG. 4 is a schematic block diagram of an embodiment of an environment sensor module of a computing system in accordance with the present invention;

Figure 9A:
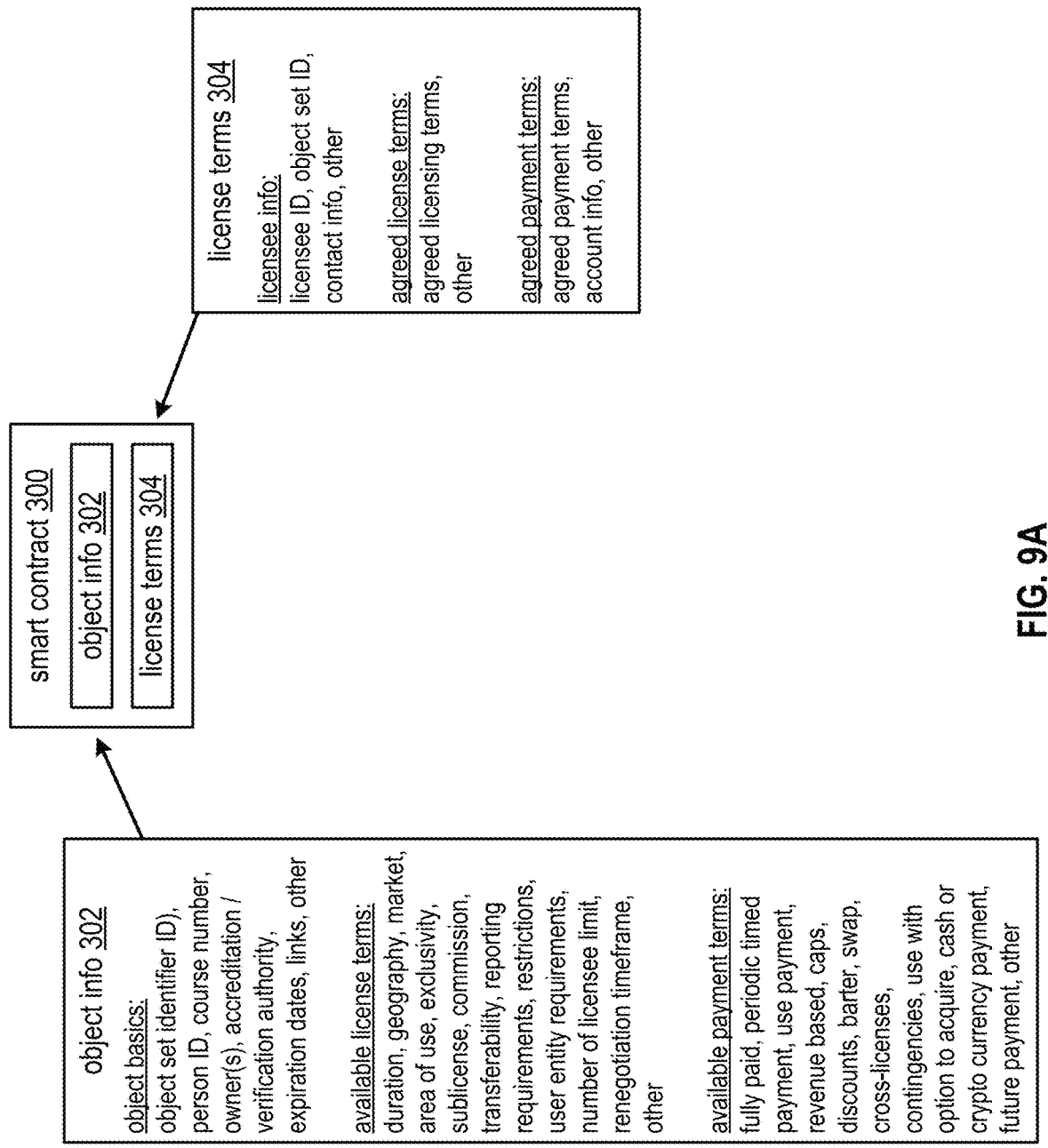
Figure 9D:
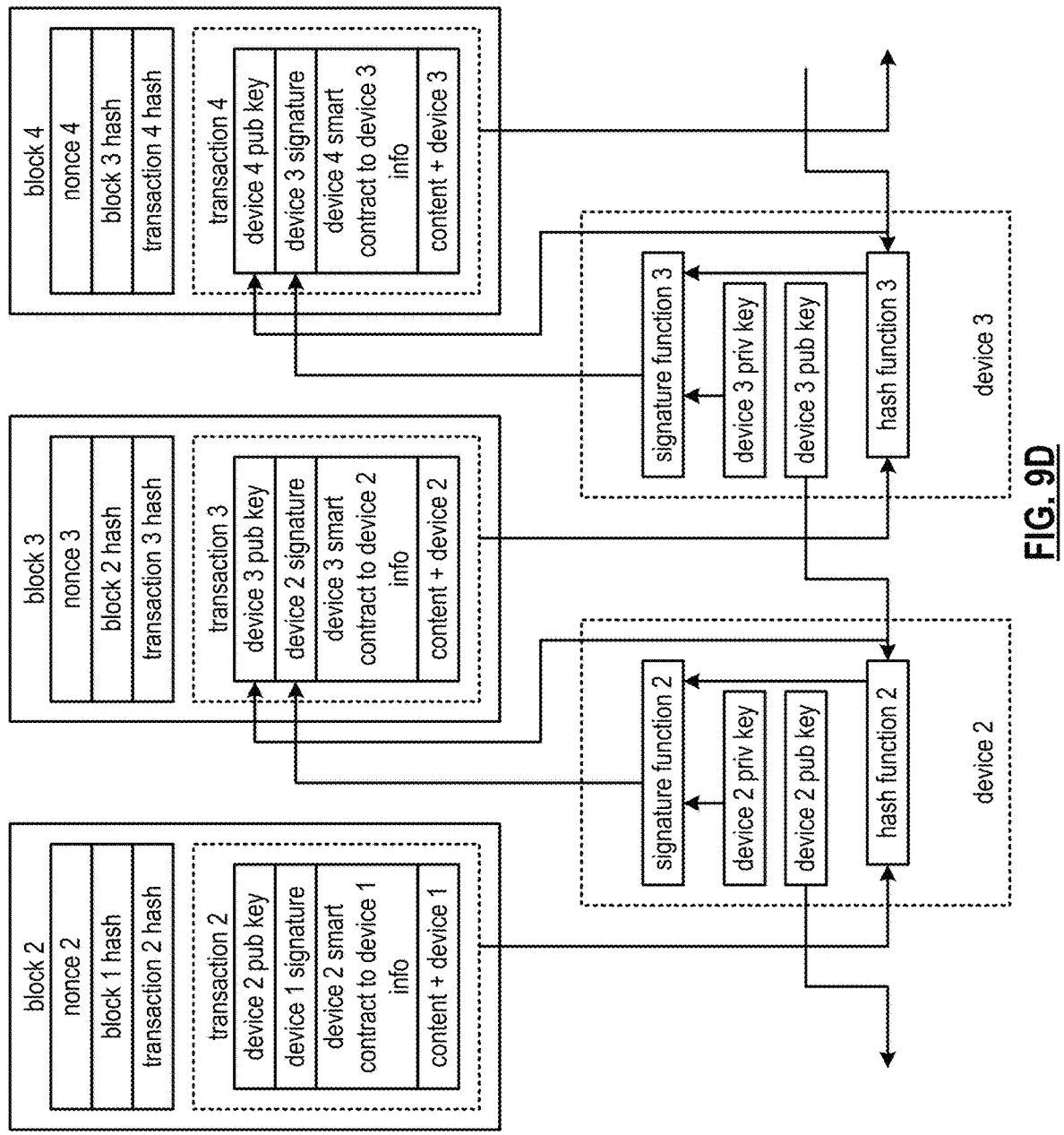
Figure 10B:
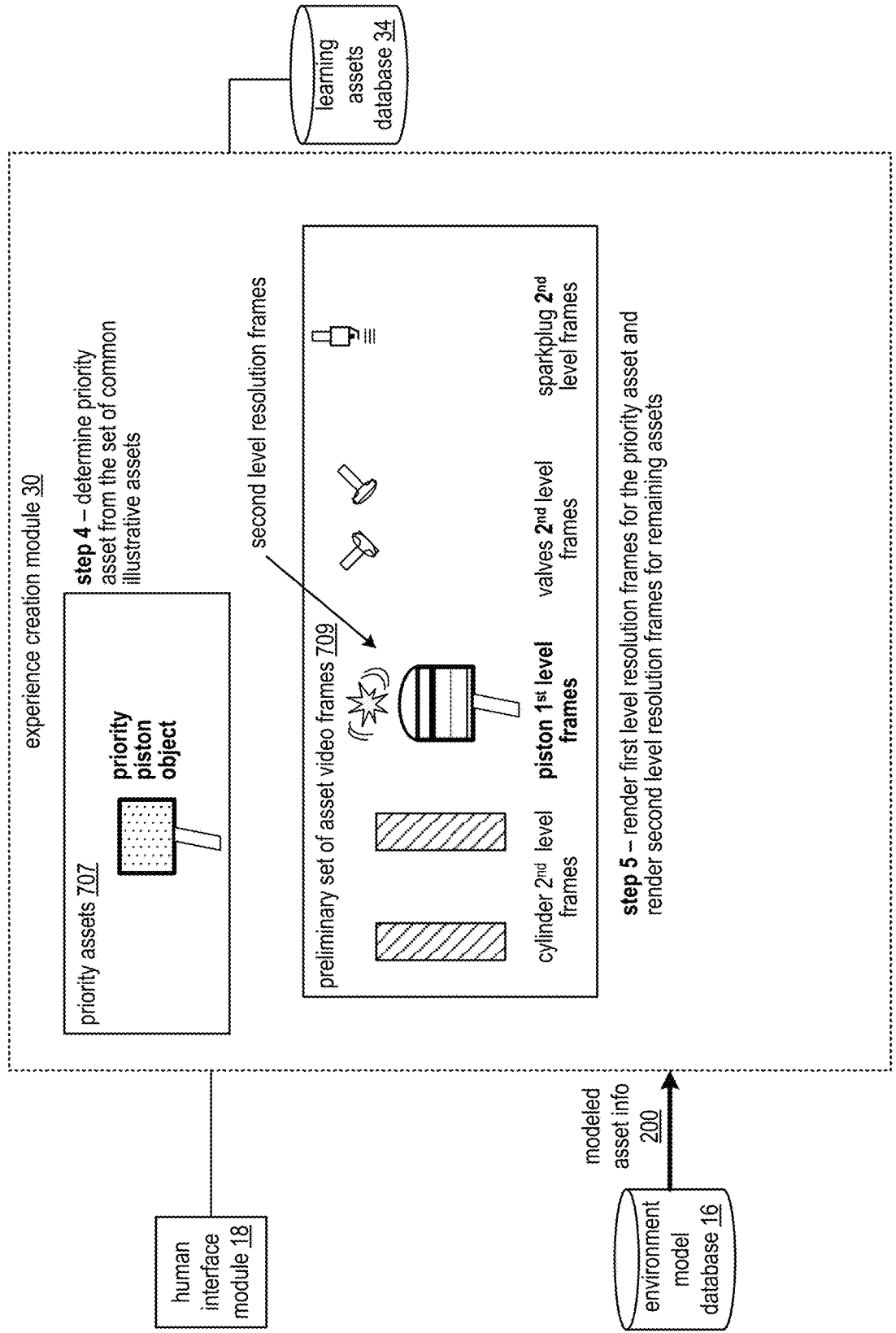
Figure 10C:
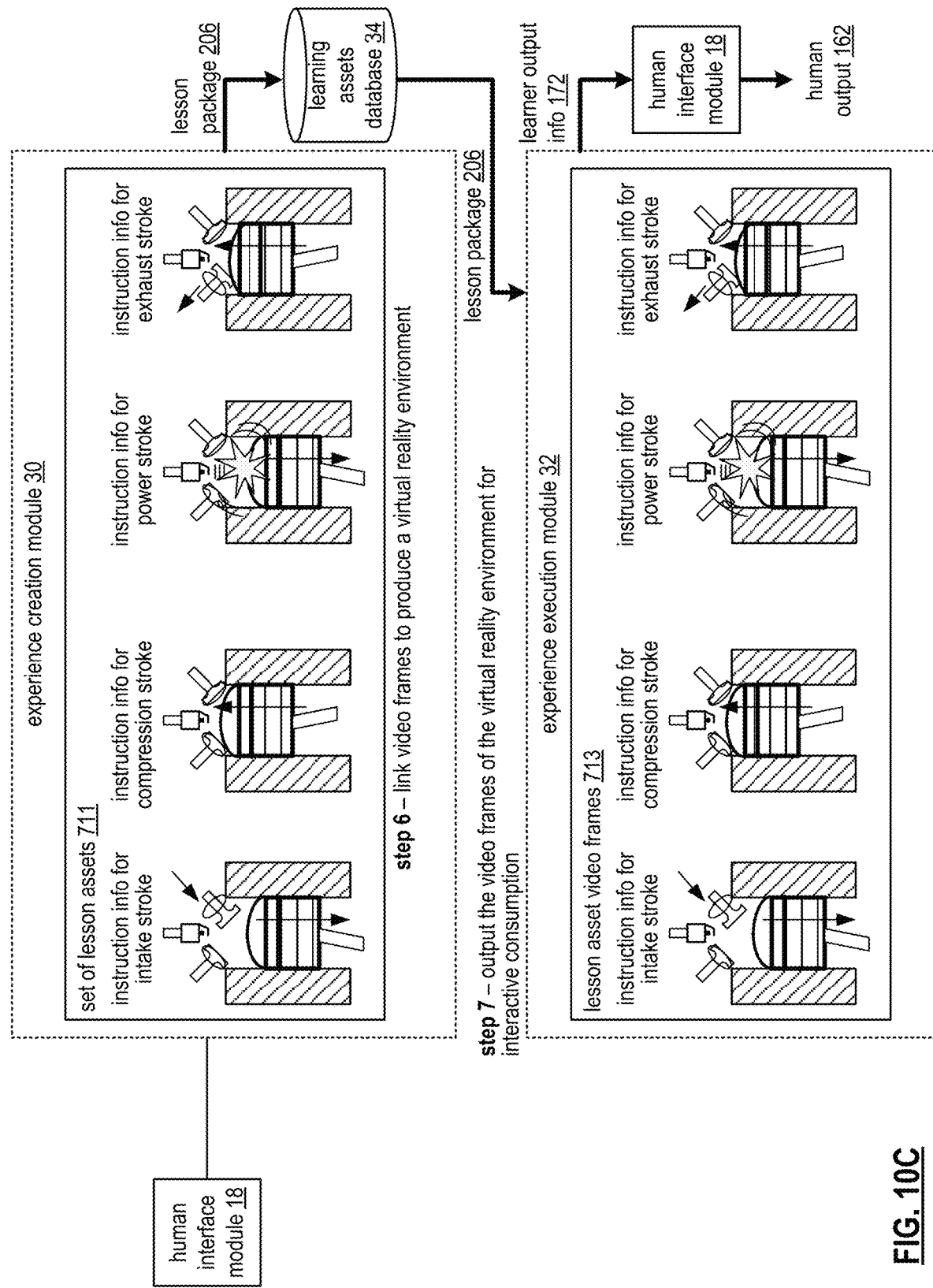
Figure 11A:
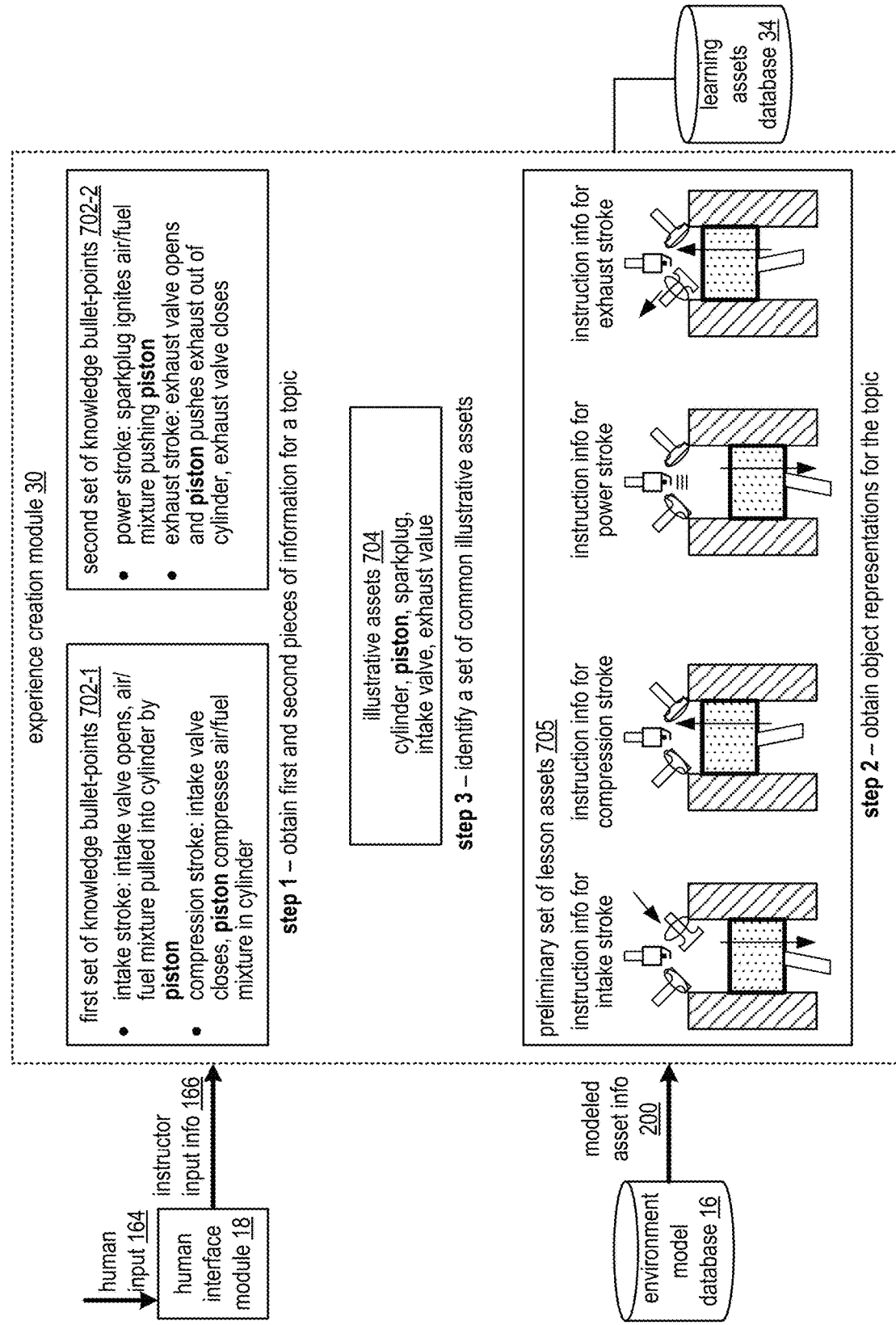
Figure 11B:
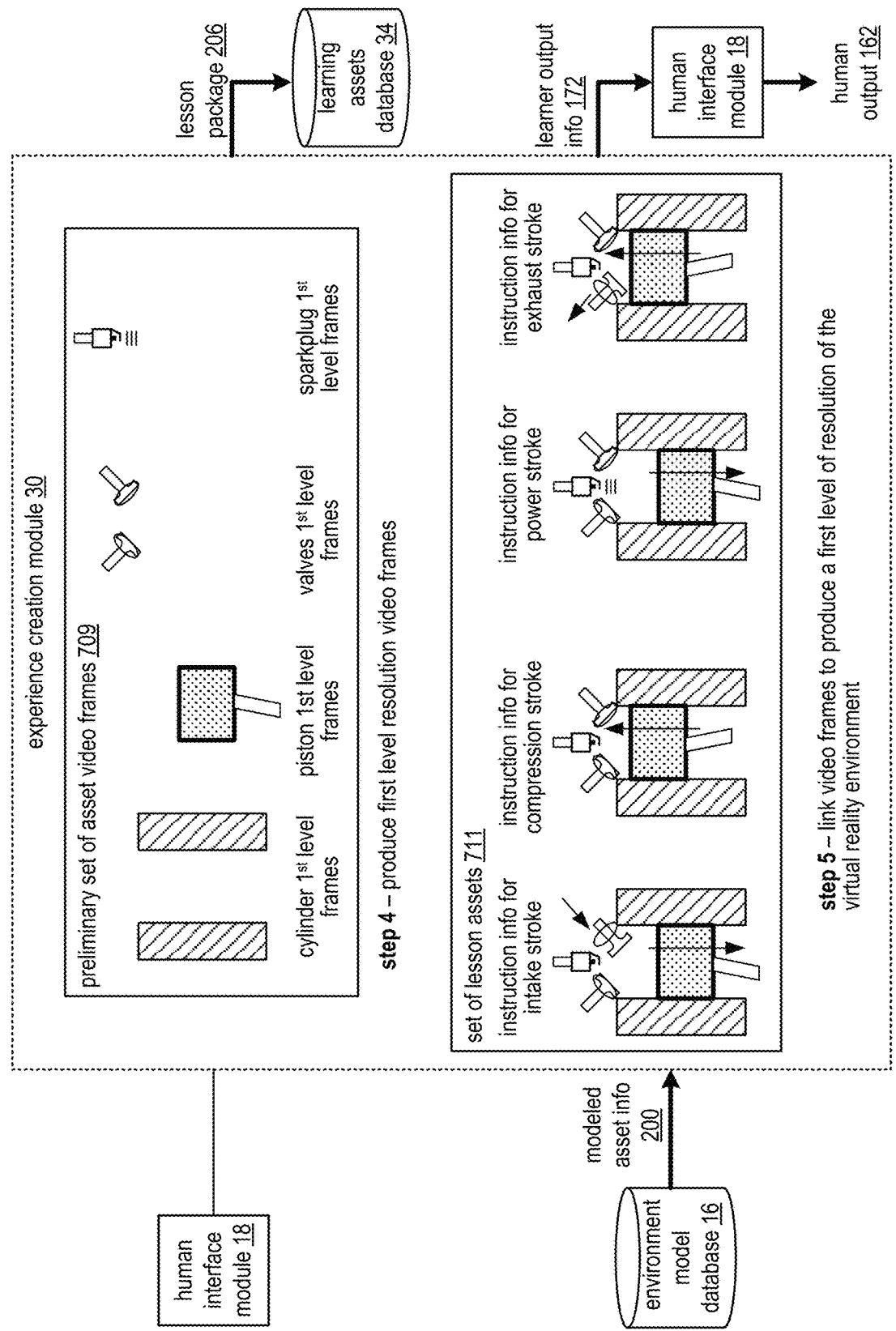
Figure 11C:
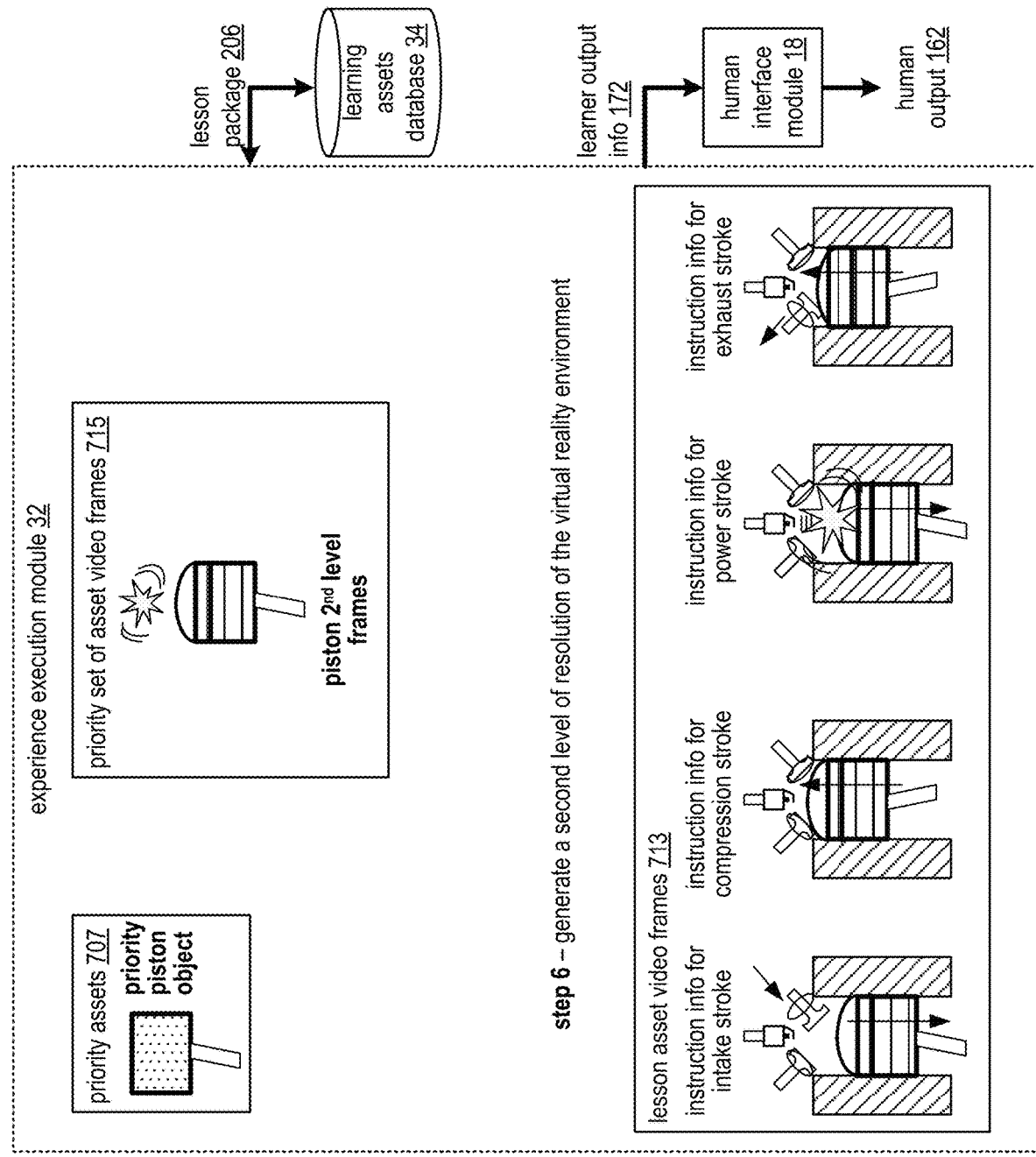
Figure 12A:
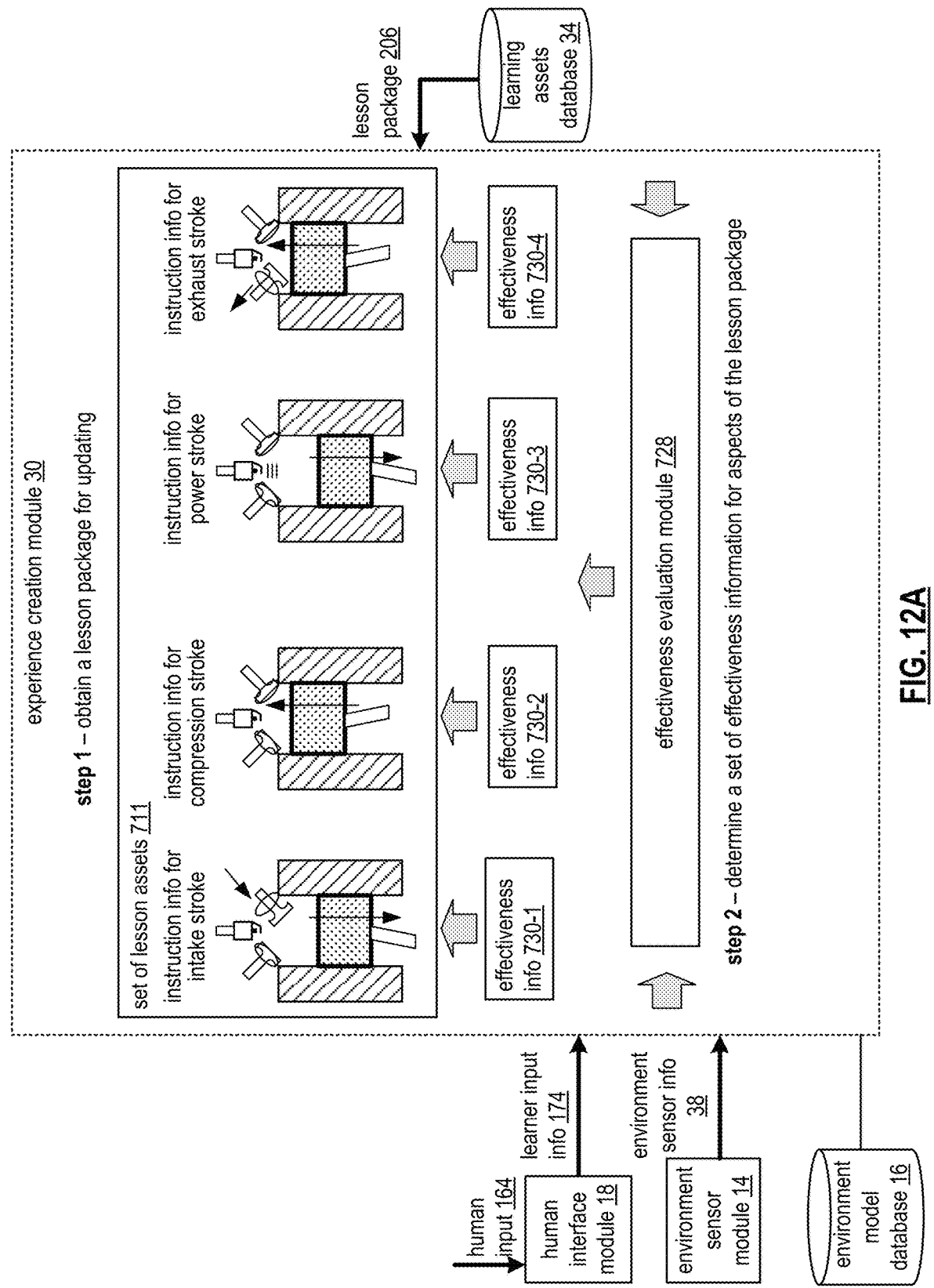
Figure 12B:
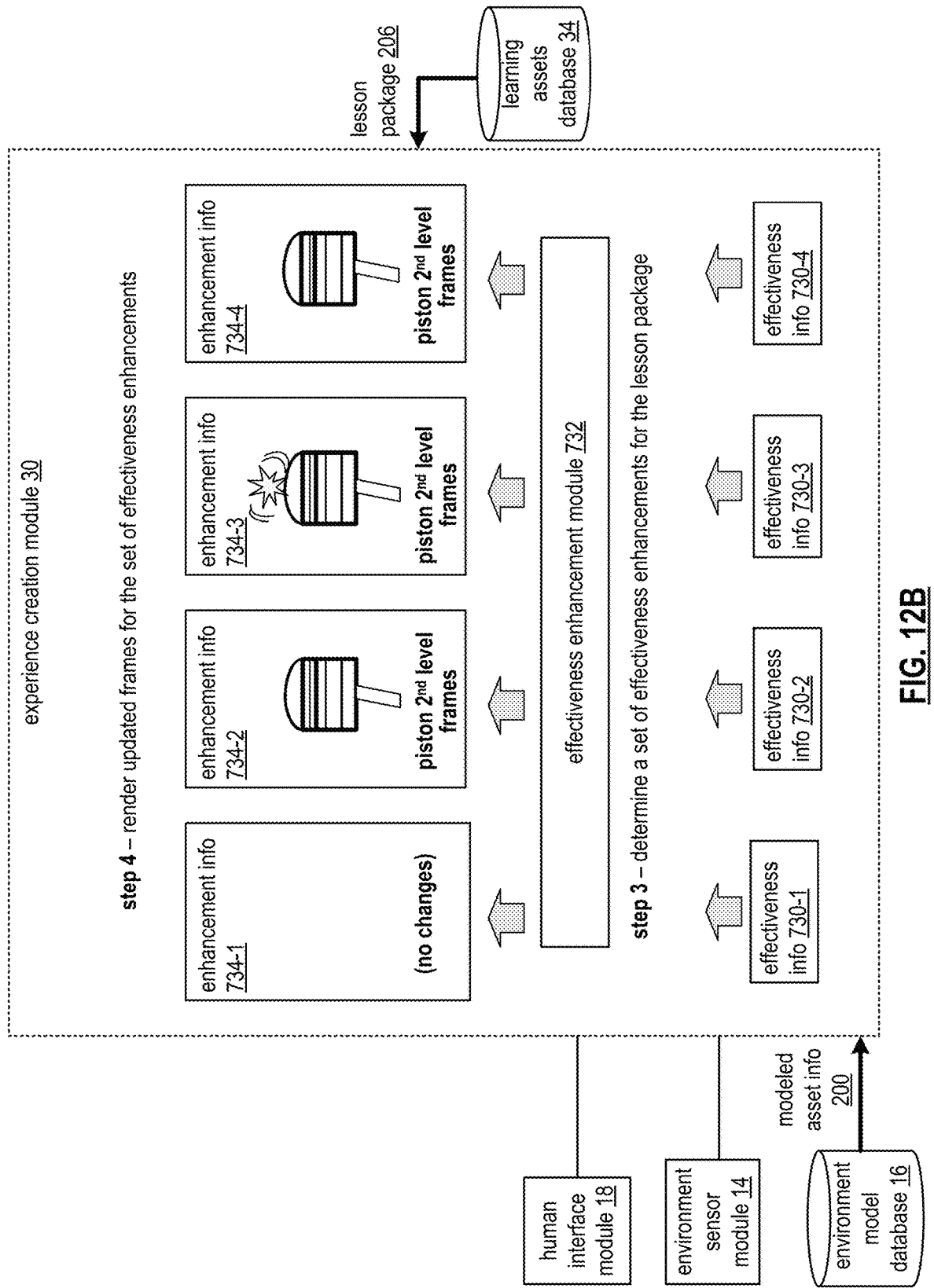
Figure 12C:
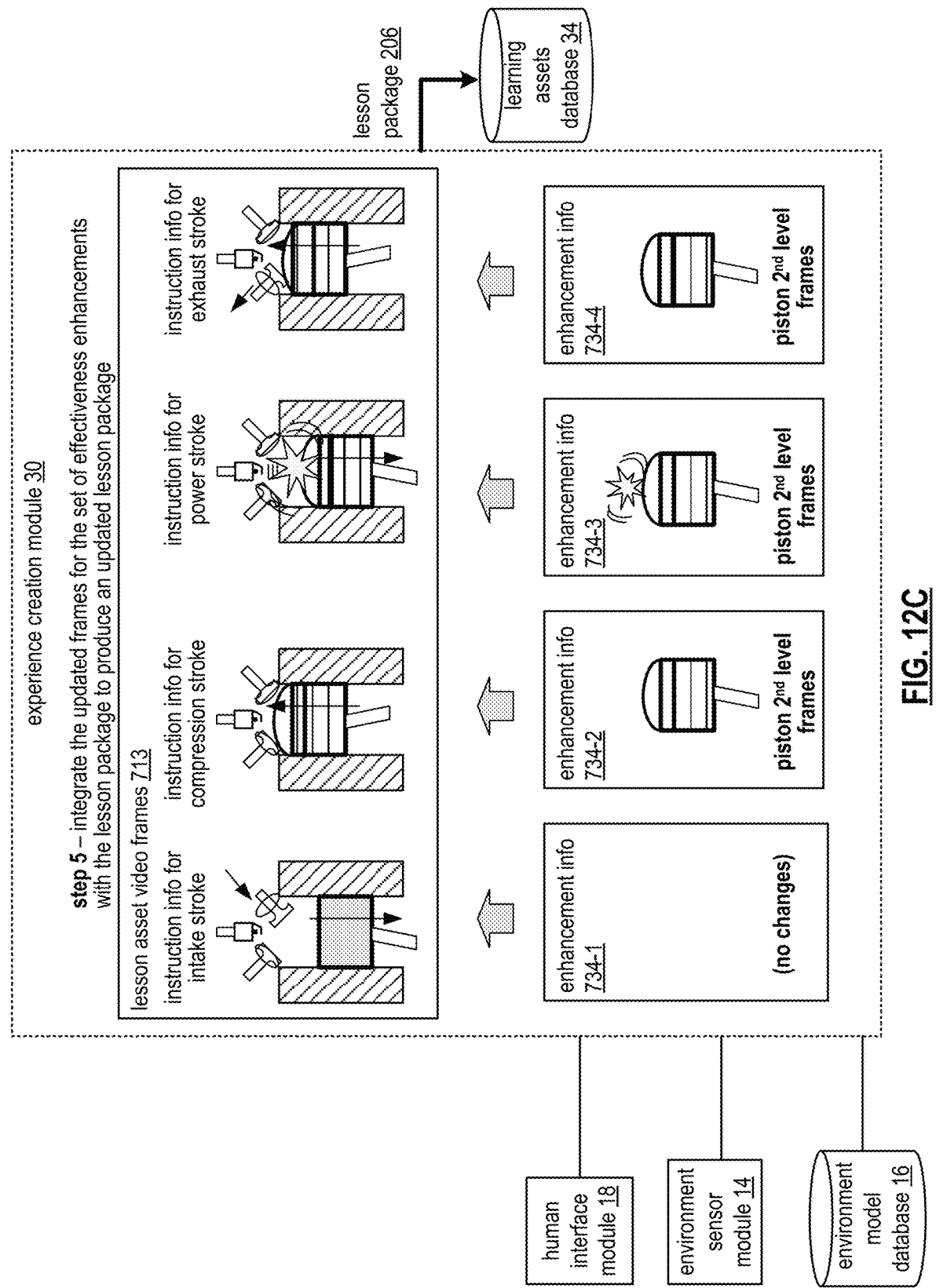
Figure 13A:
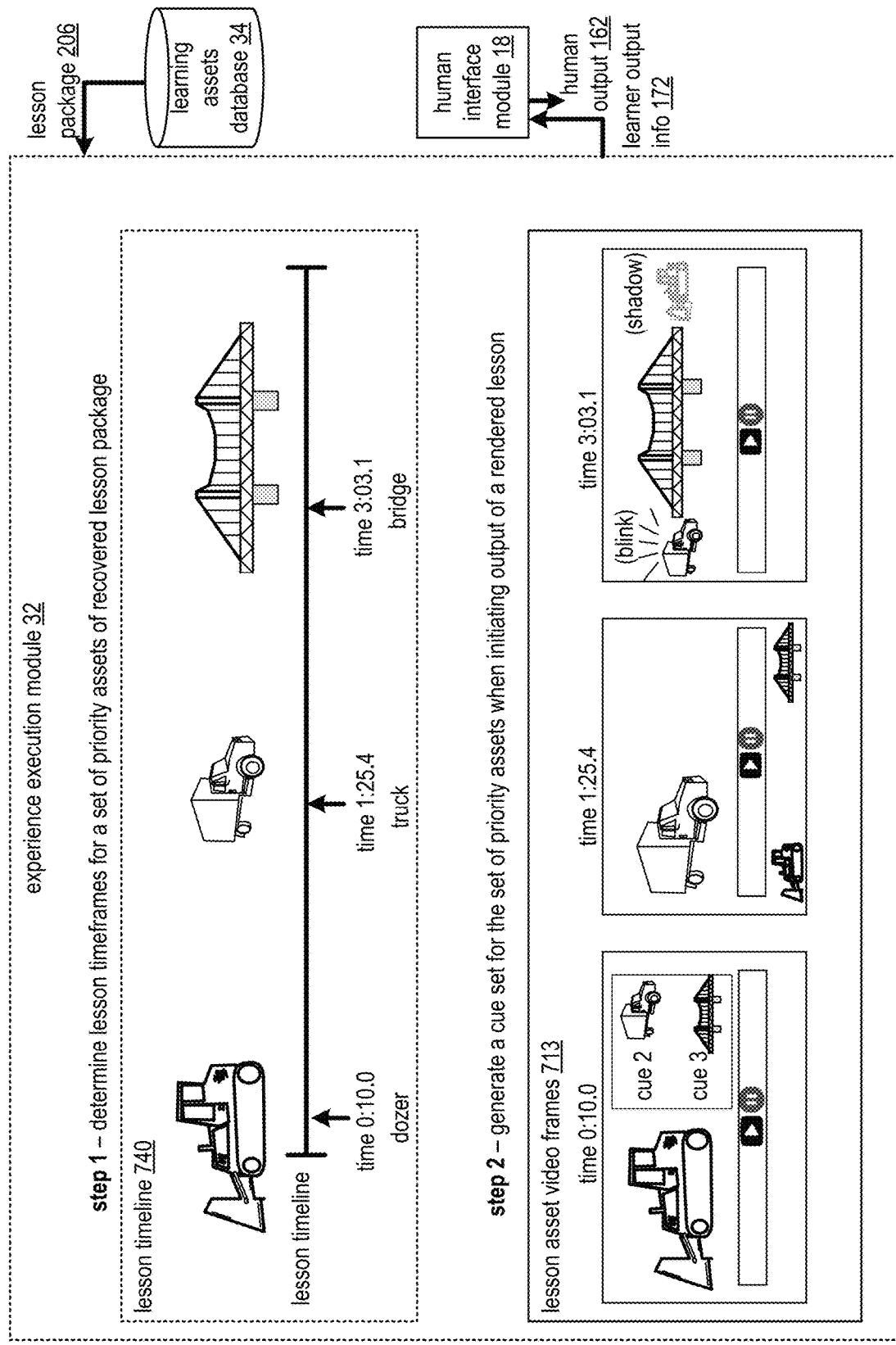
Figure 13B:
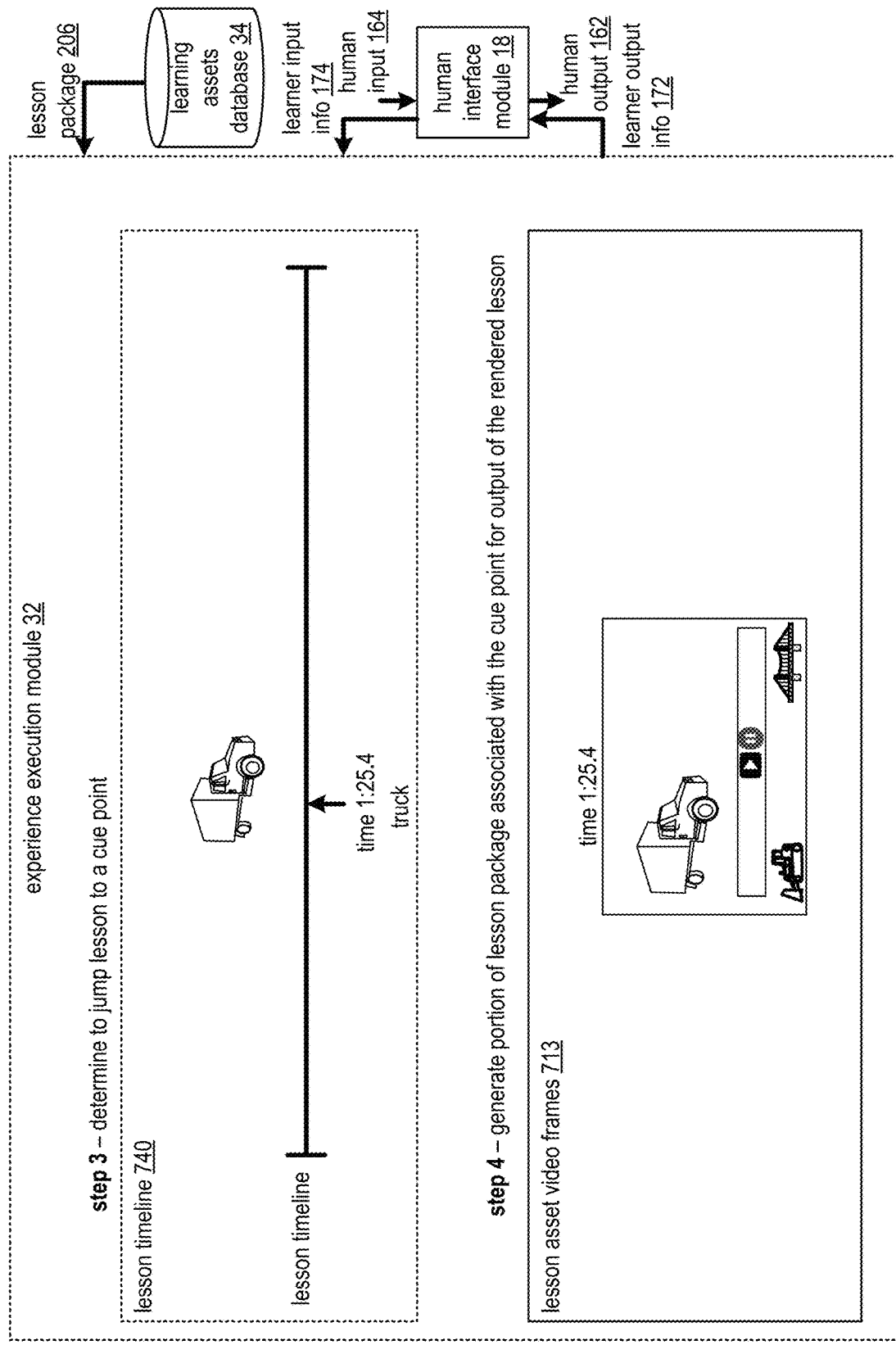
Figure 14A:
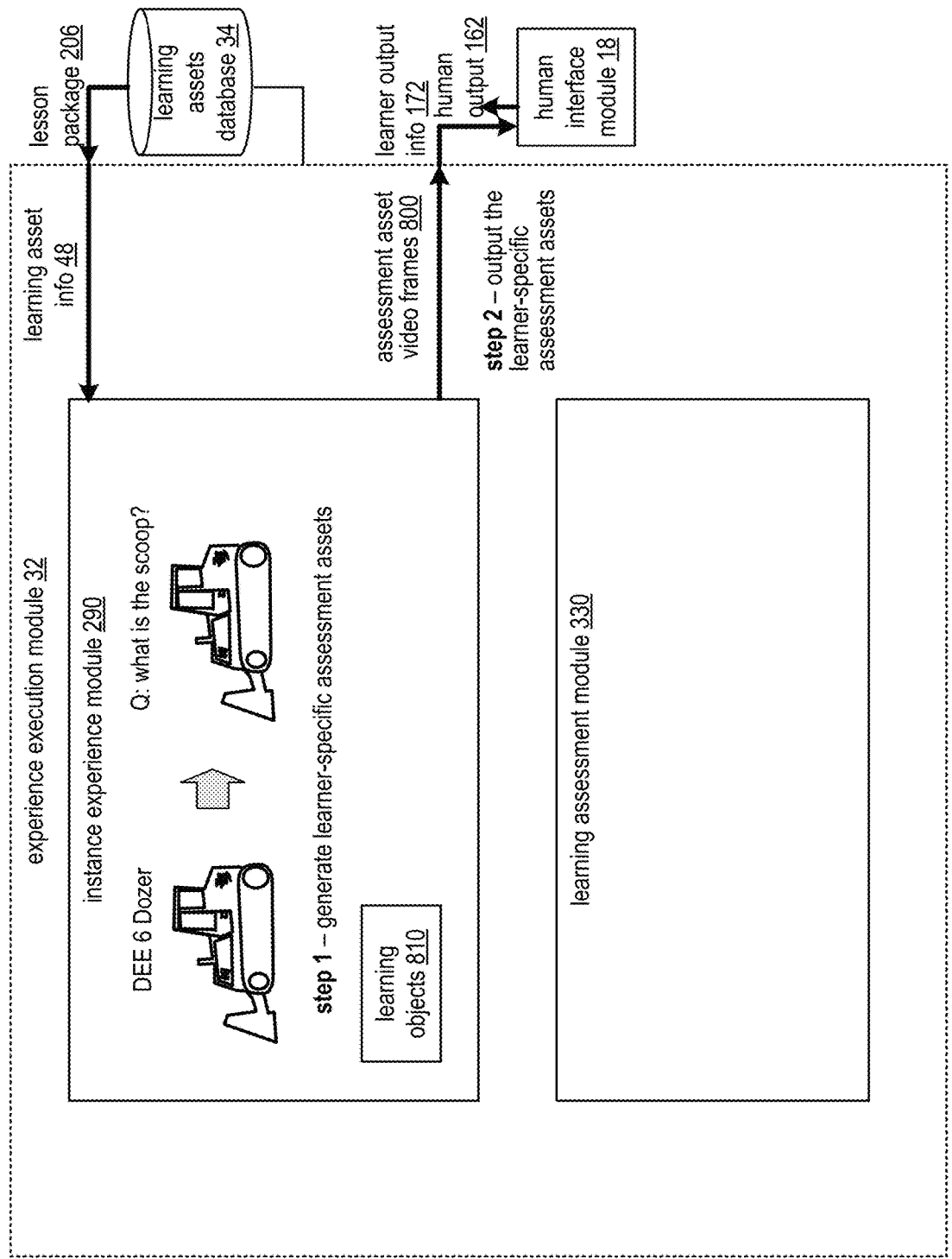
Figure 14B:
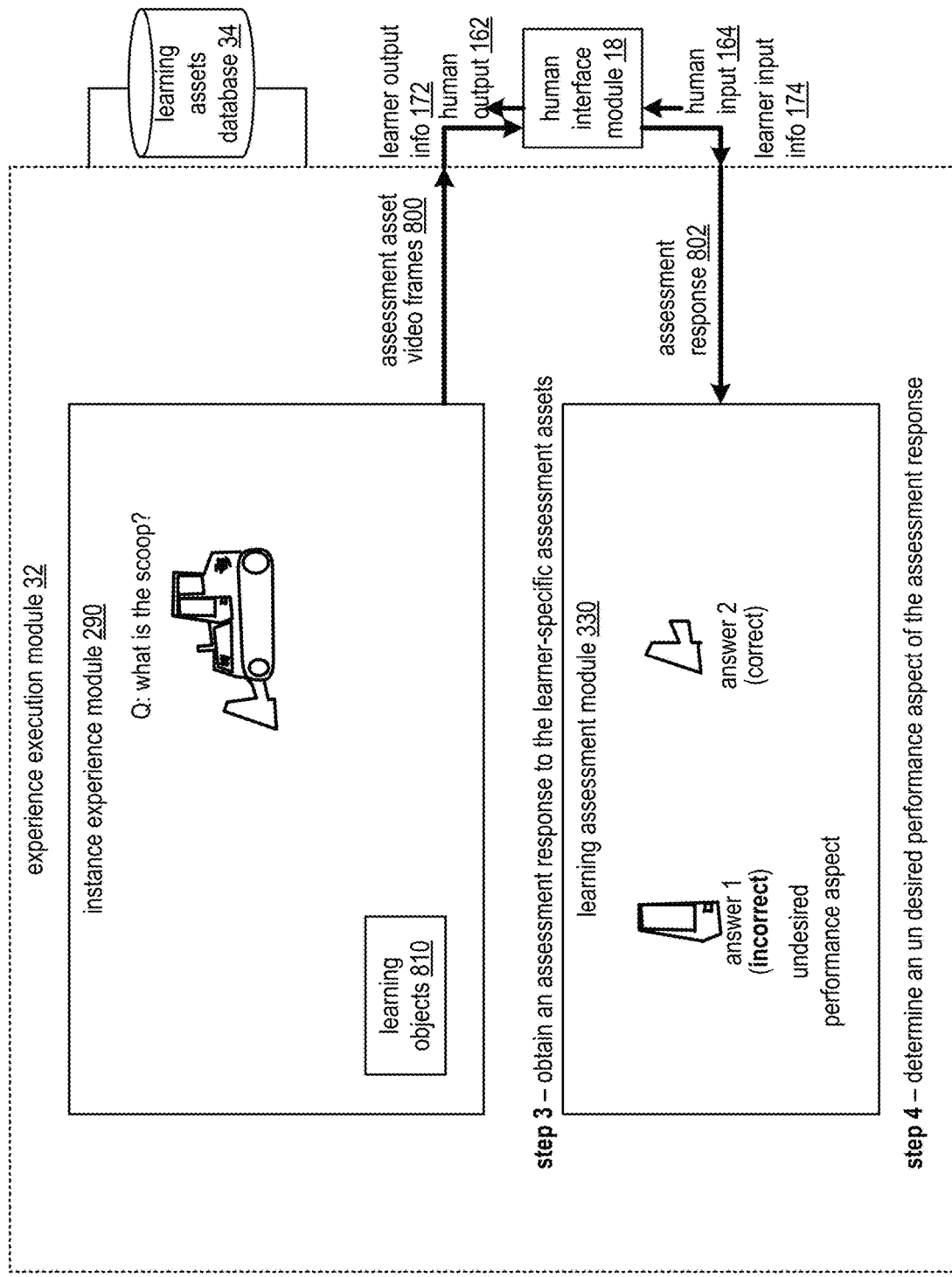
Figure 14C:
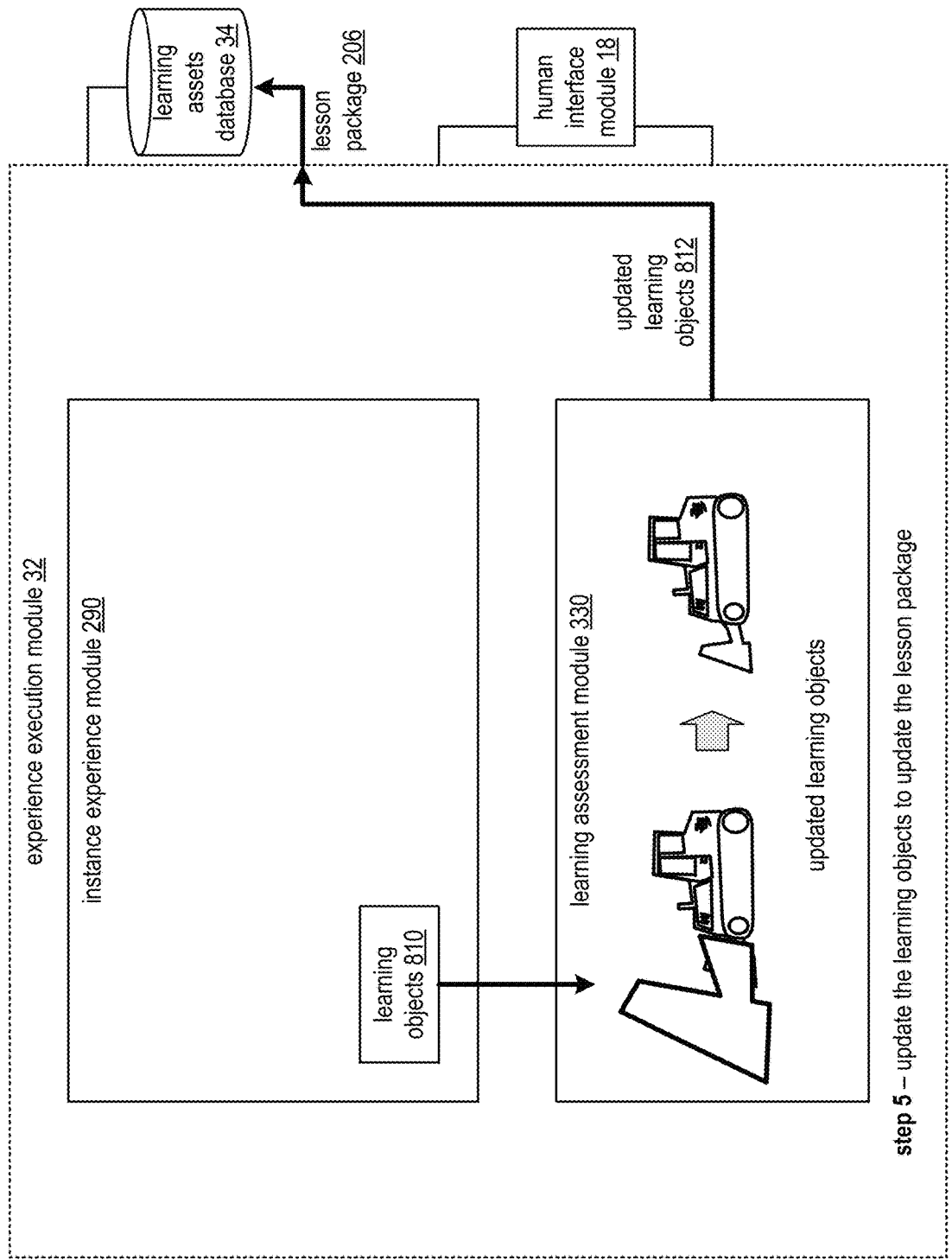

FIGS. 8E, 8F, 8G, 8H, 8J, and 8K are schematic block diagrams of another embodiment of a computing system illustrating another example of creating a learning experience in accordance with the present invention;

FIG. 9A is a schematic block diagram of a data structure for a smart contract in accordance with the present invention;

FIGS. 9B and 9C are schematic block diagrams of organization of object distributed ledgers in accordance with the present invention;

FIG. 9D is a schematic block diagram of an embodiment of a blockchain associated with an object distributed ledger in accordance with the present invention;

FIGS. 10A, 10B, and 10C are schematic block diagrams of an embodiment of a computing system illustrating an example of generating a virtual reality environment in accordance with the present invention;

FIGS. 11A, 11B, and 11C are schematic block diagrams of an embodiment of a computing system illustrating an example of generating multiple resolutions of a virtual reality environment in accordance with the present invention;

FIGS. 12A, 12B, and 12C are schematic block diagrams of an embodiment of a computing system illustrating another example of updating a lesson package in accordance with the present invention;

FIGS. 13A and 13B are schematic block diagrams of an embodiment of a computing system illustrating another example of updating a lesson package in accordance with the present invention; and FIGS. 14A, 14B, and 14C are schematic block diagrams of an embodiment of a computing system illustrating another example of updating a lesson package in accordance with the present invention.

DETAILED DESCRIPTION OF THE INVENTION

Figure 1:
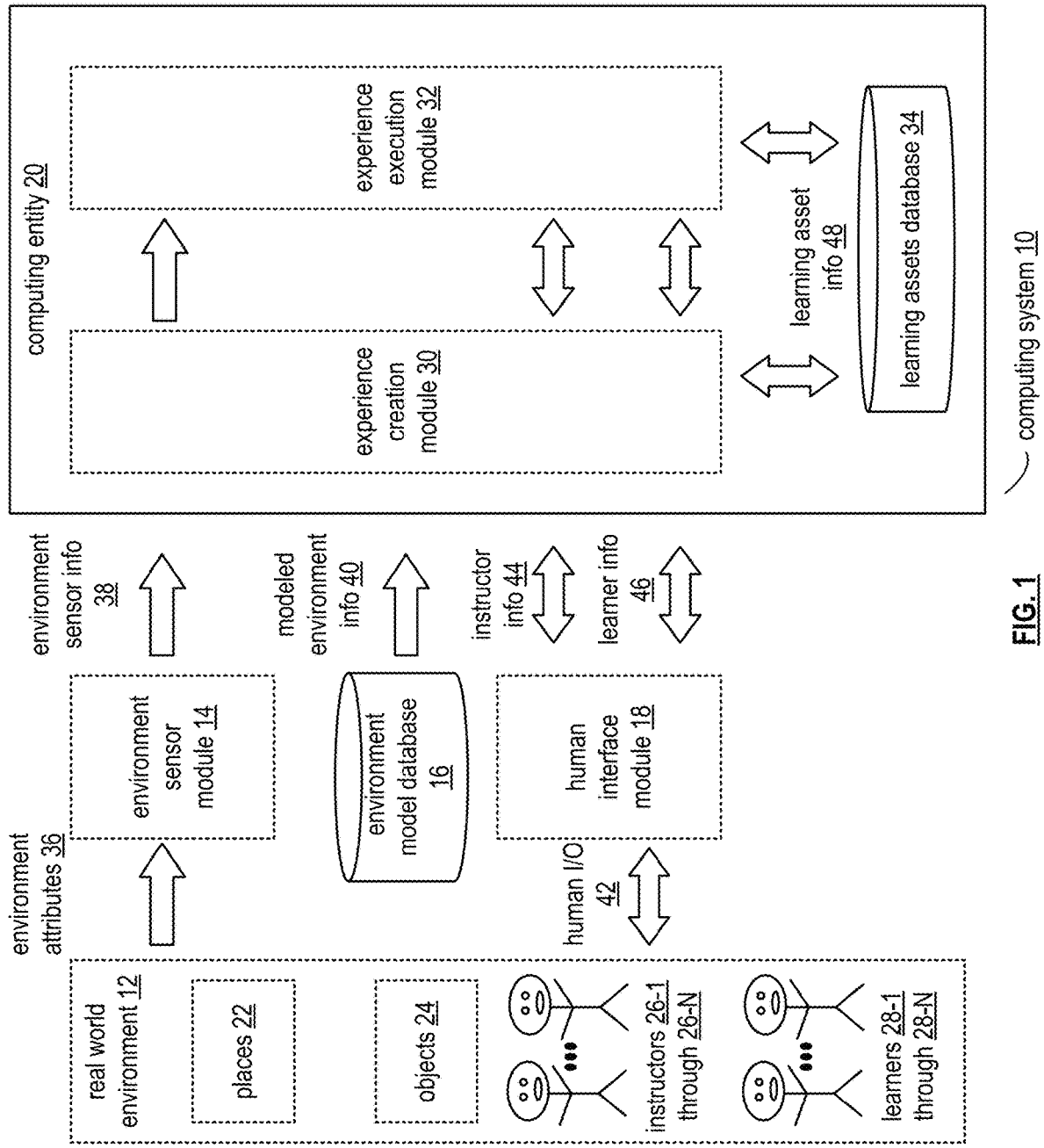
FIG. 1 is a schematic block diagram of an embodiment of a computing system in accordance with the present invention.

FIG. 1 is a schematic block diagram of an embodiment of a computing system 10 that includes a real world environment 12, an environment sensor module 14, and environment model database 16, a human interface module 18, and a computing entity 20. The real-world environment 12 includes places 22, objects 24, instructors 26-1 through 26-N, and learners 28-1 through 28-N. The computing entity 20 includes an experience creation module 30, an experience execution module 32, and a learning assets database 34.

The places 22 includes any area. Examples of places 22 includes a room, an outdoor space, a neighborhood, a city, etc. The objects 24 includes things within the places. Examples of objects 24 includes people, equipment, furniture, personal items, tools, and representations of information (i.e., video recordings, audio recordings, captured text, etc.). The instructors includes any entity (e.g., human or human proxy) imparting knowledge. The learners includes entities trying to gain knowledge and may temporarily serve as an instructor.

In an example of operation of the computing system 10, the experience creation module 30 receives environment sensor information 38 from the environment sensor module 14 based on environment attributes 36 from the real world environment 12. The environment sensor information 38 includes time-based information (e.g., static snapshot, continuous streaming) from environment attributes 36 including XYZ position information, place information, and object information (i.e., background, foreground, instructor, learner, etc.). The XYZ position information includes portrayal in a world space industry standard format (e.g., with reference to an absolute position).

The environment attributes 36 includes detectable measures of the real-world environment 12 to facilitate generation of a multi-dimensional (e.g., including time) representation of the real-world environment 12 in a virtual reality and/or augmented reality environment. For example, the environment sensor module 14 produces environment sensor information 38 associated with a medical examination room and a subject human patient (e.g., an MRI). The environment sensor module 14 is discussed in greater detail with reference to FIG. 4.

Having received the environment sensor information 38, the experience creation module 30 accesses the environment model database 16 to recover modeled environment information 40. The modeled environment information 40 includes a synthetic representation of numerous environments (e.g., model places and objects). For example, the modeled environment information 40 includes a 3-D representation of a typical human circulatory system. The models include those that are associated with certain licensing requirements (e.g., copyrights, etc.).

Having received the modeled environment information 40, the experience creation module 30 receives instructor information 44 from the human interface module 18, where the human interface module 18 receives human input/output (I/O) 42 from instructor 26-1. The instructor information 44 includes a representation of an essence of communication with a participant instructor. The human I/O 42 includes detectable fundamental forms of communication with humans or human proxies. The human interface module 18 is discussed in greater detail with reference to FIG. 3.

Having received the instructor information 44, the experience creation module 30 interprets the instructor information 44 to identify aspects of a learning experience. A learning experience includes numerous aspects of an encounter between one or more learners and an imparting of knowledge within a representation of a learning environment that includes a place, multiple objects, and one or more instructors. The learning experience further includes an instruction portion (e.g., acts to impart knowledge) and an assessment portion (e.g., further acts and/or receiving of learner input) to determine a level of comprehension of the knowledge by the one or more learners. The learning experience still further includes scoring of the level of comprehension and tallying multiple learning experiences to facilitate higher-level competency accreditations (e.g., certificates, degrees, licenses, training credits, experiences completed successfully, etc.).

As an example of the interpreting of the instructor information 44, the experience creation module 30 identifies a set of concepts that the instructor desires to impart upon a learner and a set of comprehension verifying questions and associated correct answers. The experience creation module 30 further identifies step-by-step instructor annotations associated with the various objects within the environment of the learning experience for the instruction portion and the assessment portion. For example, the experience creation module 30 identifies positions held by the instructor 26-1 as the instructor narrates a set of concepts associated with the subject patient circulatory system. As a further example, the experience creation module 30 identifies circulatory system questions and correct answers posed by the instructor associated with the narrative.

Having interpreted the instructor information 44, the experience creation module 30 renders the environment sensor information 38, the modeled environment information 40, and the instructor information 44 to produce learning assets information 48 for storage in the learning assets database 34. The learning assets information 48 includes all things associated with the learning experience to facilitate subsequent recreation. Examples includes the environment, places, objects, instructors, learners, assets, recorded instruction information, learning evaluation information, etc.

Execution of a learning experience for the one or more learners includes a variety of approaches. A first approach includes the experience execution module 32 recovering the learning assets information 48 from the learning assets database 34, rendering the learning experience as learner information 46, and outputting the learner information 46 via the human interface module 18 as further human I/O 42 to one or more of the learners 28-1 through 28-N. The learner information 46 includes information to be sent to the one or more learners and information received from the one or more learners. For example, the experience execution module 32 outputs learner information 46 associated with the instruction portion for the learner 28-1 and collects learner information 46 from the learner 28-1 that includes submitted assessment answers in response to assessment questions of the assessment portion communicated as further learner information 46 for the learner 28-1.

A second approach includes the experience execution module 32 rendering the learner information 46 as a combination of live streaming of environment sensor information 38 from the real-world environment 12 along with an augmented reality overlay based on recovered learning asset information 48. For example, a real world subject human patient in a medical examination room is live streamed as the environment sensor information 38 in combination with a prerecorded instruction portion from the instructor 26-1.

Figure 2A:
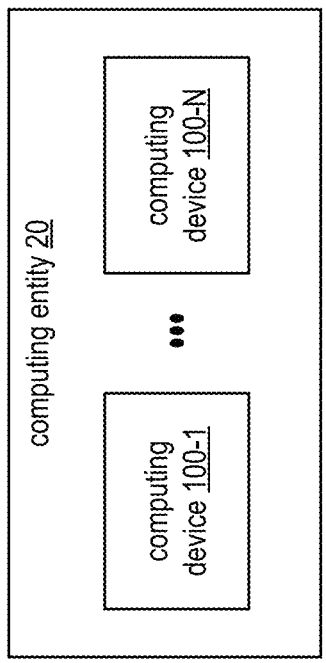
FIG. 2A is a schematic block diagram of an embodiment of a computing entity of a computing system in accordance with the present invention.

FIG. 2A is a schematic block diagram of an embodiment of the computing entity 20 of the computing system 10. The computing entity 20 includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
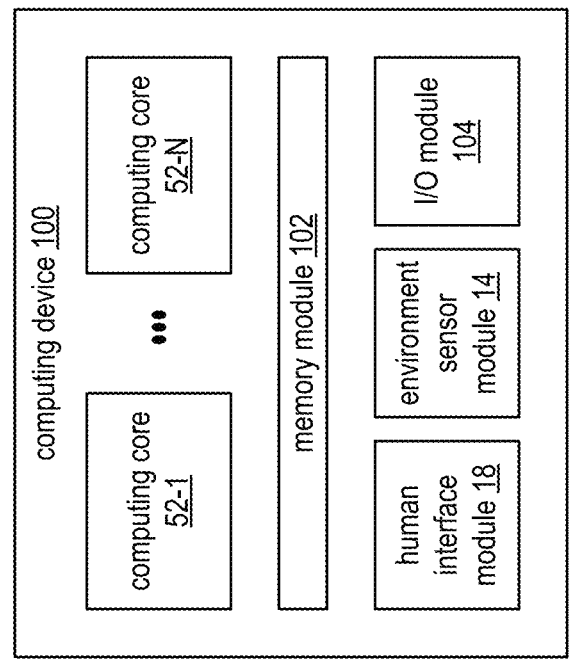
FIG. 2B is a schematic block diagram of an embodiment of a computing device of a computing system in accordance with the present invention.

FIG. 2B is a schematic block diagram of an embodiment of a computing device 100 of the computing system 10 that includes one or more computing cores 52-1 through 52-N, a memory module 102, the human interface module 18, the environment sensor module 14, and an I/O module 104. In alternative embodiments, the human interface module 18, the environment sensor module 14, the I/O module 104, and the memory module 102 may be standalone (e.g., external to the computing device). An embodiment of the computing device 100 will be discussed in greater detail with reference to FIG. 3.

Figure 3:
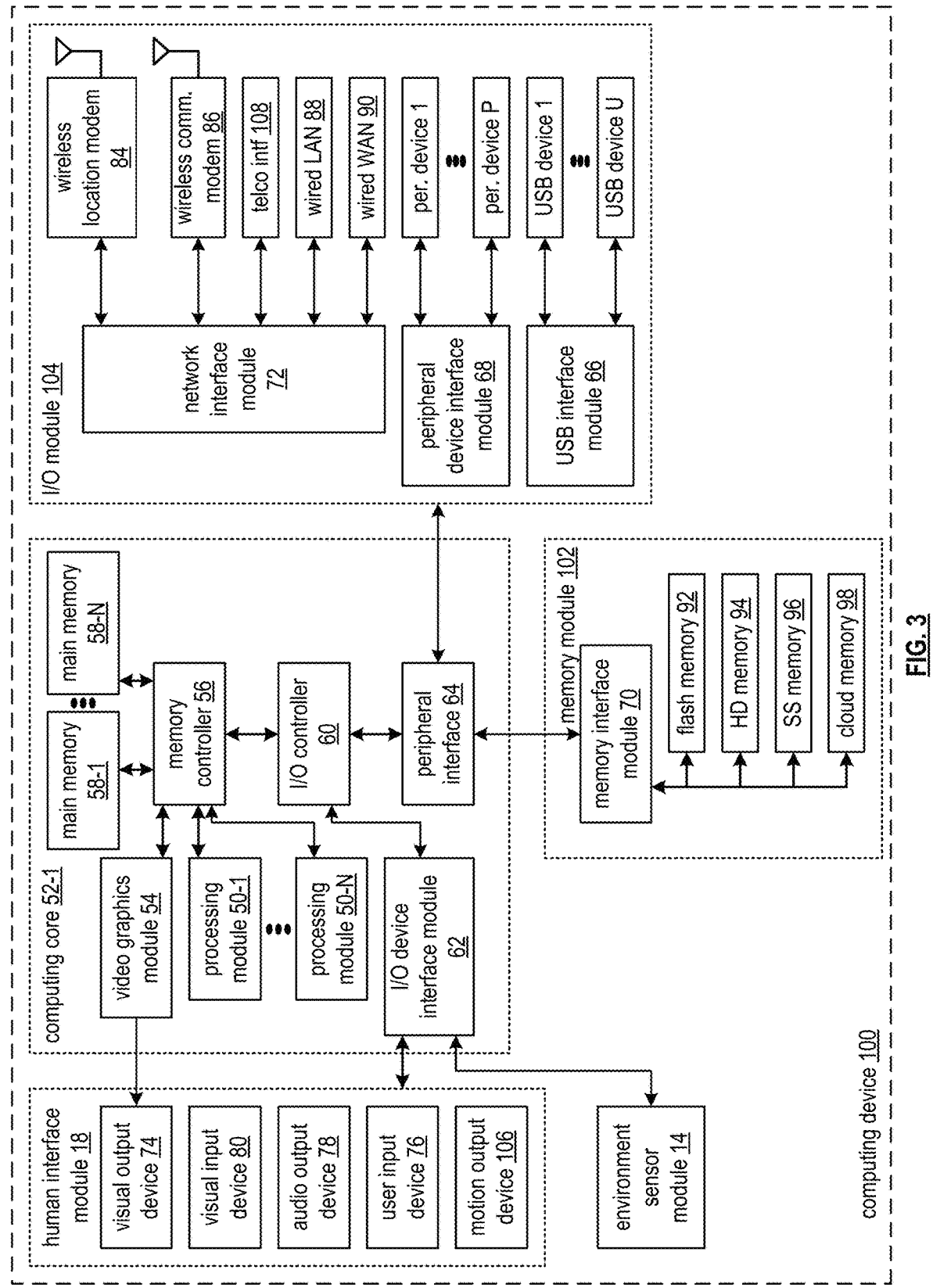
FIG. 3 is a schematic block diagram of another embodiment of a computing device of a computing system in accordance with the present invention.

FIG. 3 is a schematic block diagram of another embodiment of the computing device 100 of the computing system 10 that includes the human interface module 18, the environment sensor module 14, the computing core 52-1, the memory module 102, and the I/O module 104. The human interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100 may include more or less devices and modules than shown in this example embodiment.

FIG. 4 is a schematic block diagram of an embodiment of the environment sensor module 14 of the computing system 10 that includes a sensor interface module 120 to output environment sensor information 150 based on information communicated with a set of sensors. The set of sensors includes a visual sensor 122 (e.g., to the camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, Mill, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, immuno, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

Figure 5A:
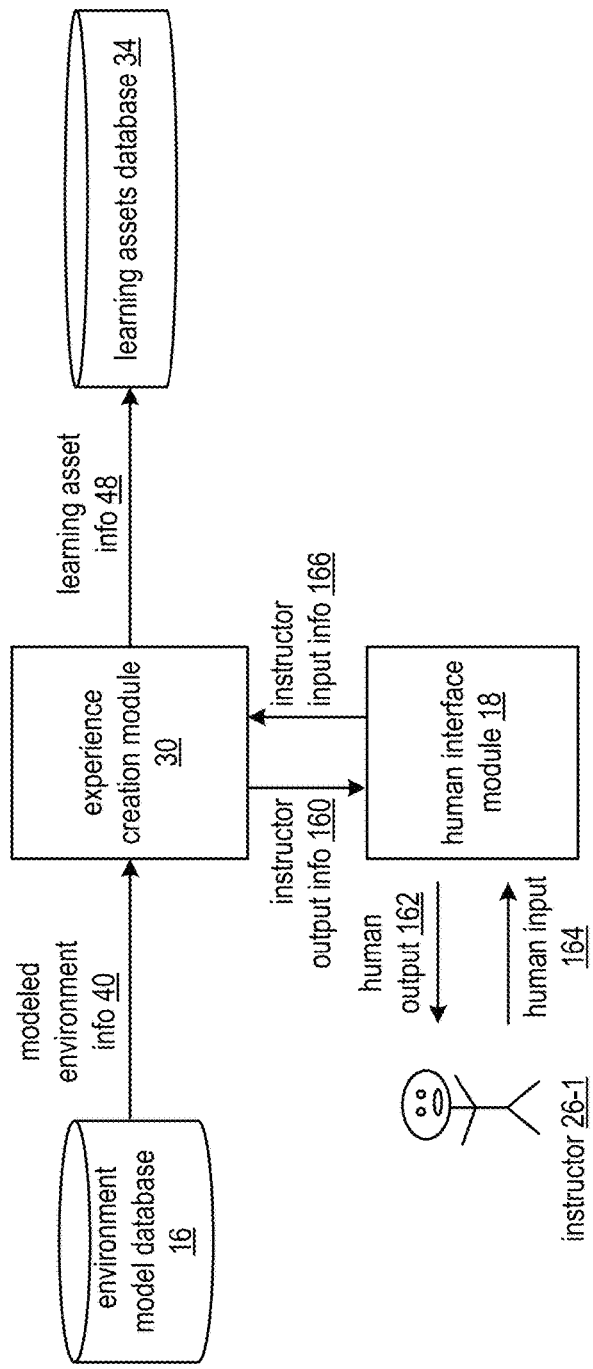
FIG. 5A is a schematic block diagram of another embodiment of a computing system in accordance with the present invention.

FIG. 5A is a schematic block diagram of another embodiment of a computing system that includes the environment model database 16, the human interface module 18, the instructor 26-1, the experience creation module 30, and the learning assets database 34 of FIG. 1. In an example of operation, the experience creation module 30 obtains modeled environment information 40 from the environment model database 16 and renders a representation of an environment and objects of the modeled environment information 40 to output as instructor output information 160. The human interface module 18 transforms the instructor output information 160 into human output 162 for presentation to the instructor 26-1. For example, the human output 162 includes a 3-D visualization and stereo audio output.

In response to the human output 162, the human interface module 18 receives human input 164 from the instructor 26-1. For example, the human input 164 includes pointer movement information and human speech associated with a lesson. The human interface module 18 transforms the human input 164 into instructor input information 166. The instructor input information 166 includes one or more of representations of instructor interactions with objects within the environment and explicit evaluation information (e.g., questions to test for comprehension level, and correct answers to the questions).

Having received the instructor input information 166, the experience creation module 30 renders a representation of the instructor input information 166 within the environment utilizing the objects of the modeled environment information 40 to produce learning asset information 48 for storage in the learnings assets database 34. Subsequent access of the learning assets information 48 facilitates a learning experience.

Figure 5B:
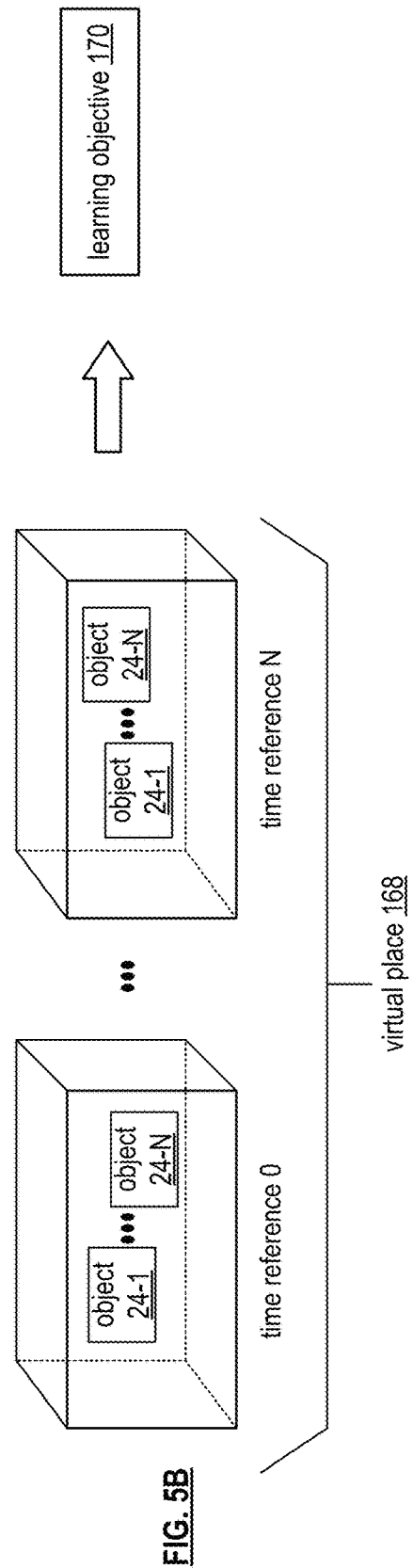
FIG. 5B is a schematic block diagram of an embodiment of a representation of a learning experience in accordance with the present invention.

FIG. 5B is a schematic block diagram of an embodiment of a representation of a learning experience that includes a virtual place 168 and a resulting learning objective 170. A learning objective represents a portion of an overall learning experience, where the learning objective is associated with at least one major concept of knowledge to be imparted to a learner. The major concept may include several sub-concepts. The makeup of the learning objective is discussed in greater detail with reference to FIG. 6.

The virtual place 168 includes a representation of an environment (e.g., a place) over a series of time intervals (e.g., time 0-N). The environment includes a plurality of objects 24-1 through 24-N. At each time reference, the positions of the objects can change in accordance with the learning experience. For example, the instructor 26-1 of FIG. 5A interacts with the objects to convey a concept. The sum of the positions of the environment and objects within the virtual place 168 is wrapped into the learning objective 170 for storage and subsequent utilization when executing the learning experience.

Figure 6:
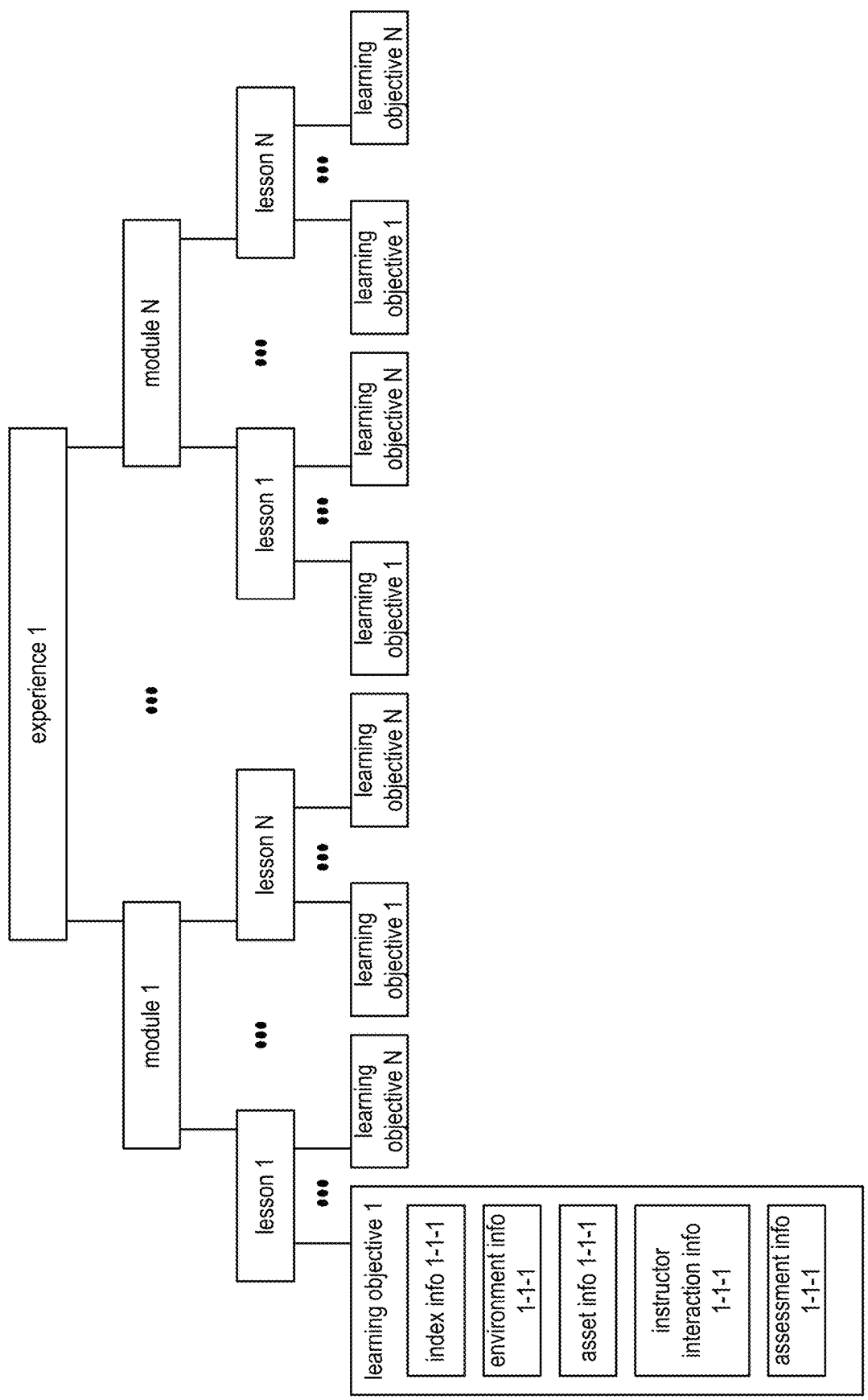
FIG. 6 is a schematic block diagram of another embodiment of a representation of a learning experience in accordance with the present invention.

FIG. 6 is a schematic block diagram of another embodiment of a representation of a learning experience that includes a plurality of modules 1-N. Each module includes a set of lessons 1-N. Each lesson includes a plurality of learning objectives 1-N. The learning experience typically is played from left to right where learning objectives are sequentially executed in lesson 1 of module 1 followed by learning objectives of lesson 2 of module 1 etc.

As learners access the learning experience during execution, the ordering may be accessed in different ways to suit the needs of the unique learner based on one or more of preferences, experience, previously demonstrated comprehension levels, etc. For example, a particular learner may skip over lesson 1 of module 1 and go right to lesson 2 of module 1 when having previously demonstrated competency of the concepts associated with lesson 1.

Each learning objective includes indexing information, environment information, asset information, instructor interaction information, and assessment information. The index information includes one or more of categorization information, topics list, instructor identification, author identification, identification of copyrighted materials, keywords, concept titles, prerequisites for access, and links to related learning objectives.

The environment information includes one or more of structure information, environment model information, background information, identifiers of places, and categories of environments. The asset information includes one or more of object identifiers, object information (e.g., modeling information), asset ownership information, asset type descriptors (e.g., 2-D, 3-D). Examples include models of physical objects, stored media such as videos, scans, images, digital representations of text, digital audio, and graphics.

The instructor interaction information includes representations of instructor annotations, actions, motions, gestures, expressions, eye movement information, facial expression information, speech, and speech inflections. The content associated with the instructor interaction information includes overview information, speaker notes, actions associated with assessment information, (e.g., pointing to questions, revealing answers to the questions, motioning related to posing questions) and conditional learning objective execution ordering information (e.g., if the learner does this then take this path, otherwise take another path).

The assessment information includes a summary of desired knowledge to impart, specific questions for a learner, correct answers to the specific questions, multiple-choice question sets, and scoring information associated with writing answers. The assessment information further includes historical interactions by other learners with the learning objective (e.g., where did previous learners look most often within the environment of the learning objective, etc.), historical responses to previous comprehension evaluations, and actions to facilitate when a learner responds with a correct or incorrect answer (e.g., motion stimulus to activate upon an incorrect answer to increase a human stress level).

Figure 7A:
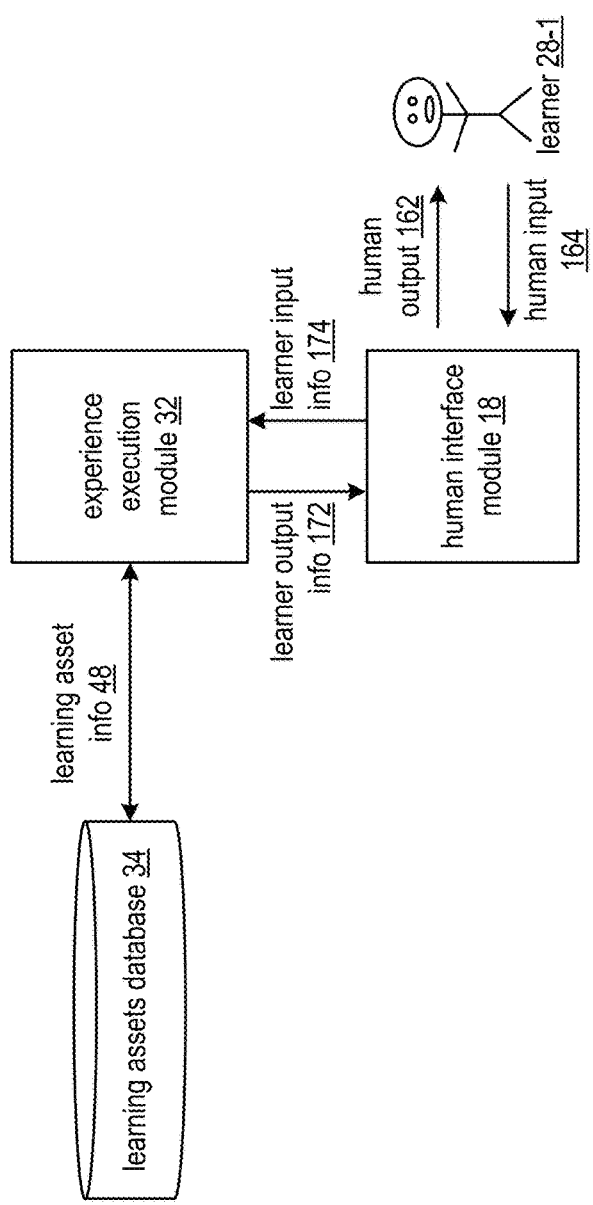
FIG. 7A is a schematic block diagram of another embodiment of a computing system in accordance with the present invention.

FIG. 7A is a schematic block diagram of another embodiment of a computing system that includes the learning assets database 34, the experience execution module 32, the human interface module 18, and the learner 28-1 of FIG. 1. In an example of operation, the experience execution module 32 recovers learning asset information 48 from the learning assets database 34 (e.g., in accordance with a selection by the learner 28-1). The experience execution module 32 renders a group of learning objectives associated with a common lesson within an environment utilizing objects associated with the lesson to produce learner output information 172. The learner output information 172 includes a representation of a virtual place and objects that includes instructor interactions and learner interactions from a perspective of the learner.

The human interface module 18 transforms the learner output information 172 into human output 162 for conveyance of the learner output information 172 to the learner 28-1. For example, the human interface module 18 facilitates displaying a 3-D image of the virtual environment to the learner 28-1.

The human interface module 18 transforms human input 164 from the learner 28-1 to produce learner input information 174. The learner input information 174 includes representations of learner interactions with objects within the virtual place (e.g., answering comprehension level evaluation questions).

The experience execution module 32 updates the representation of the virtual place by modifying the learner output information 172 based on the learner input information 174 so that the learner 28-1 enjoys representations of interactions caused by the learner within the virtual environment. The experience execution module 32 evaluates the learner input information 174 with regards to evaluation information of the learning objectives to evaluate a comprehension level by the learner 28-1 with regards to the set of learning objectives of the lesson.

Figure 7B:
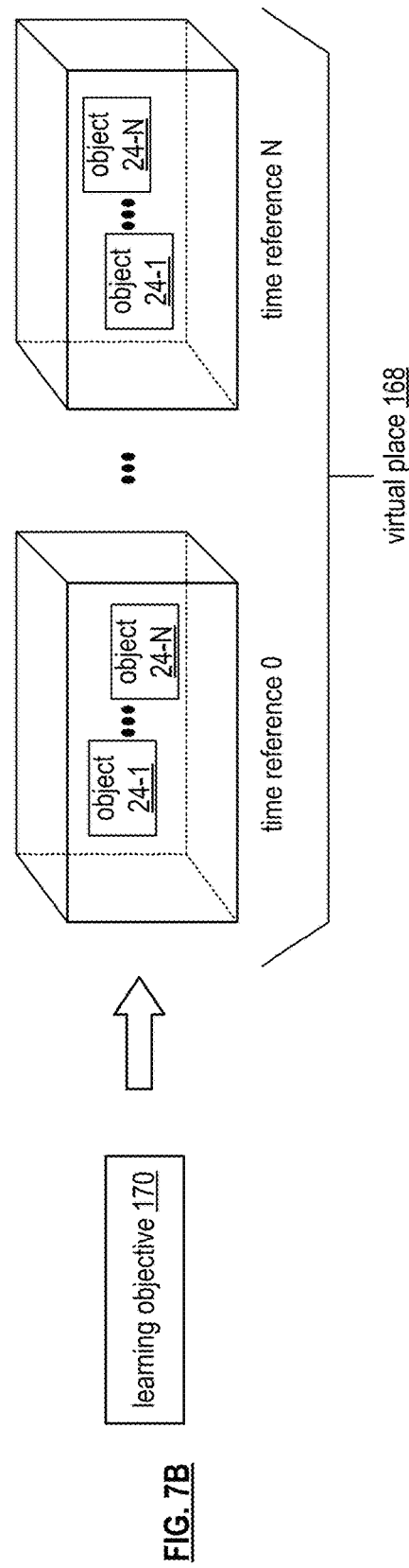
FIG. 7B is a schematic block diagram of another embodiment of a representation of a learning experience in accordance with the present invention.

FIG. 7B is a schematic block diagram of another embodiment of a representation of a learning experience that includes the learning objective 170 and the virtual place 168. In an example of operation, the learning objective 170 is recovered from the learning assets database 34 of FIG. 7A and rendered to create the virtual place 168 representations of objects 24-1 through 24-N in the environment from time references zero through N. For example, a first object is the instructor 26-1 of FIG. 5A, a second object is the learner 28-1 of FIG. 7A, and the remaining objects are associated with the learning objectives of the lesson, where the objects are manipulated in accordance with annotations of instructions provided by the instructor 26-1.

The learner 28-1 experiences a unique viewpoint of the environment and gains knowledge from accessing (e.g., playing) the learning experience. The learner 28-1 further manipulates objects within the environment to support learning and assessment of comprehension of objectives of the learning experience.

Figure 8A:
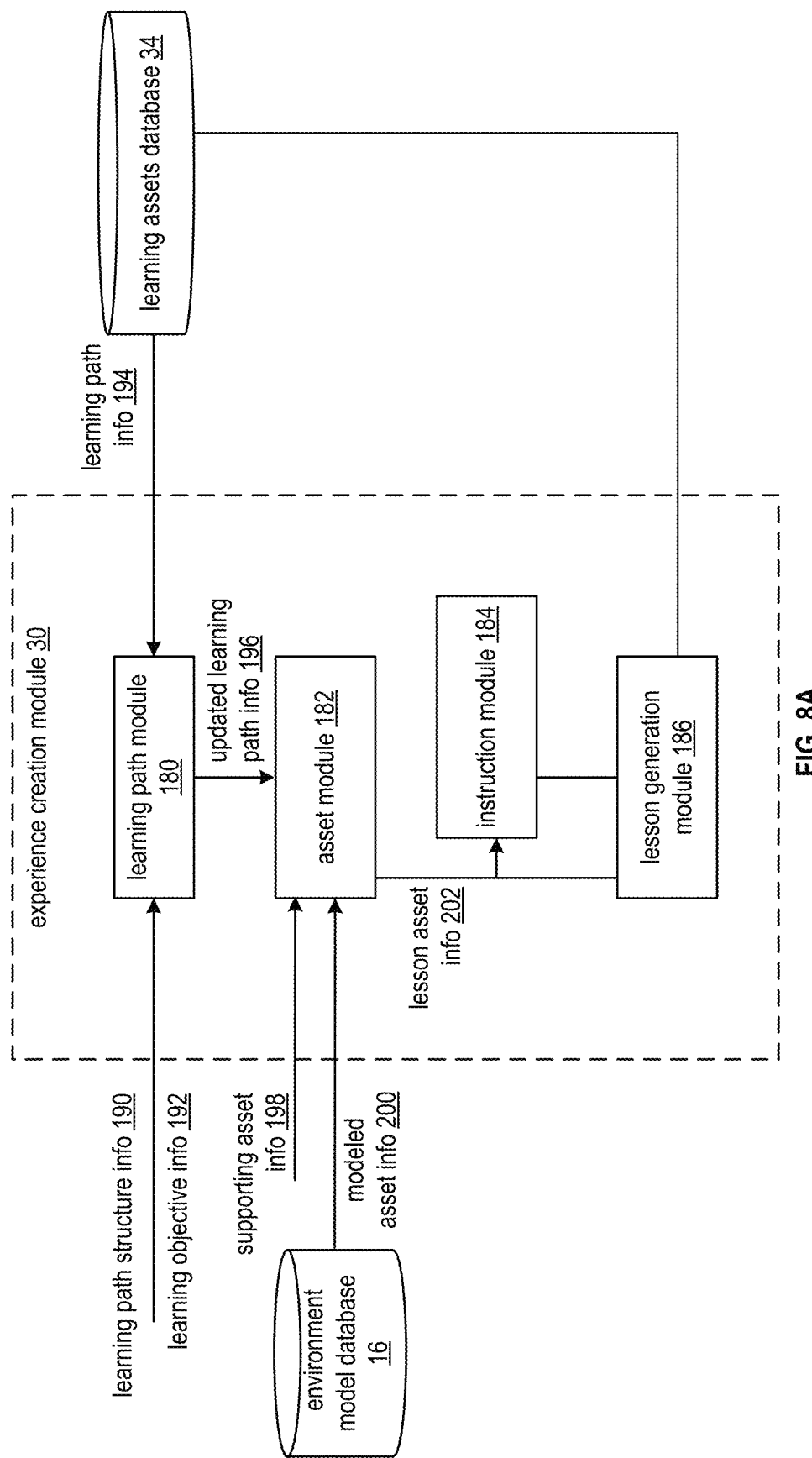
FIGS. 8A-8C are schematic block diagrams of another embodiment of a computing system illustrating an example of creating a learning experience in accordance with the present invention.
Figure 8B:
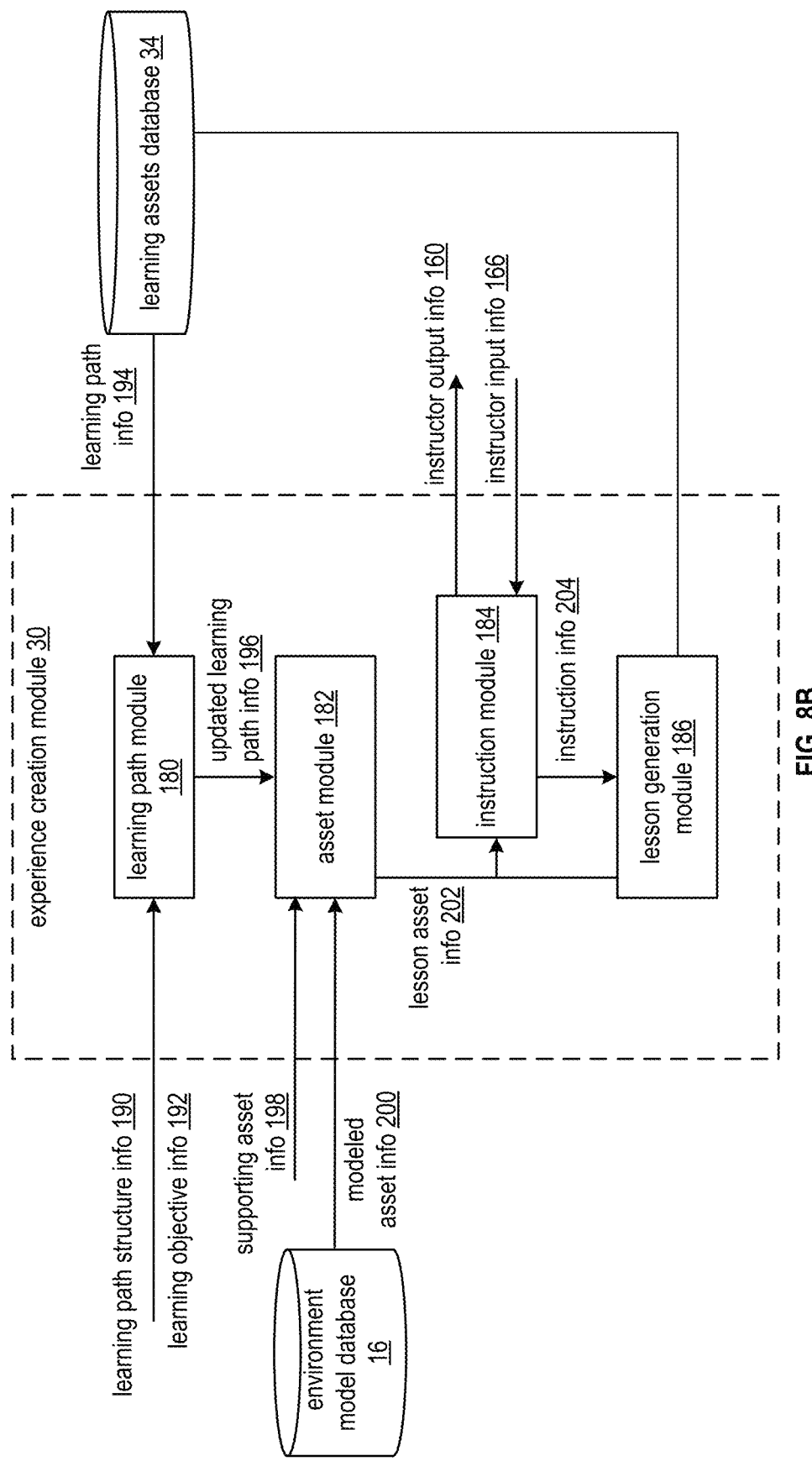
Figure 8C:
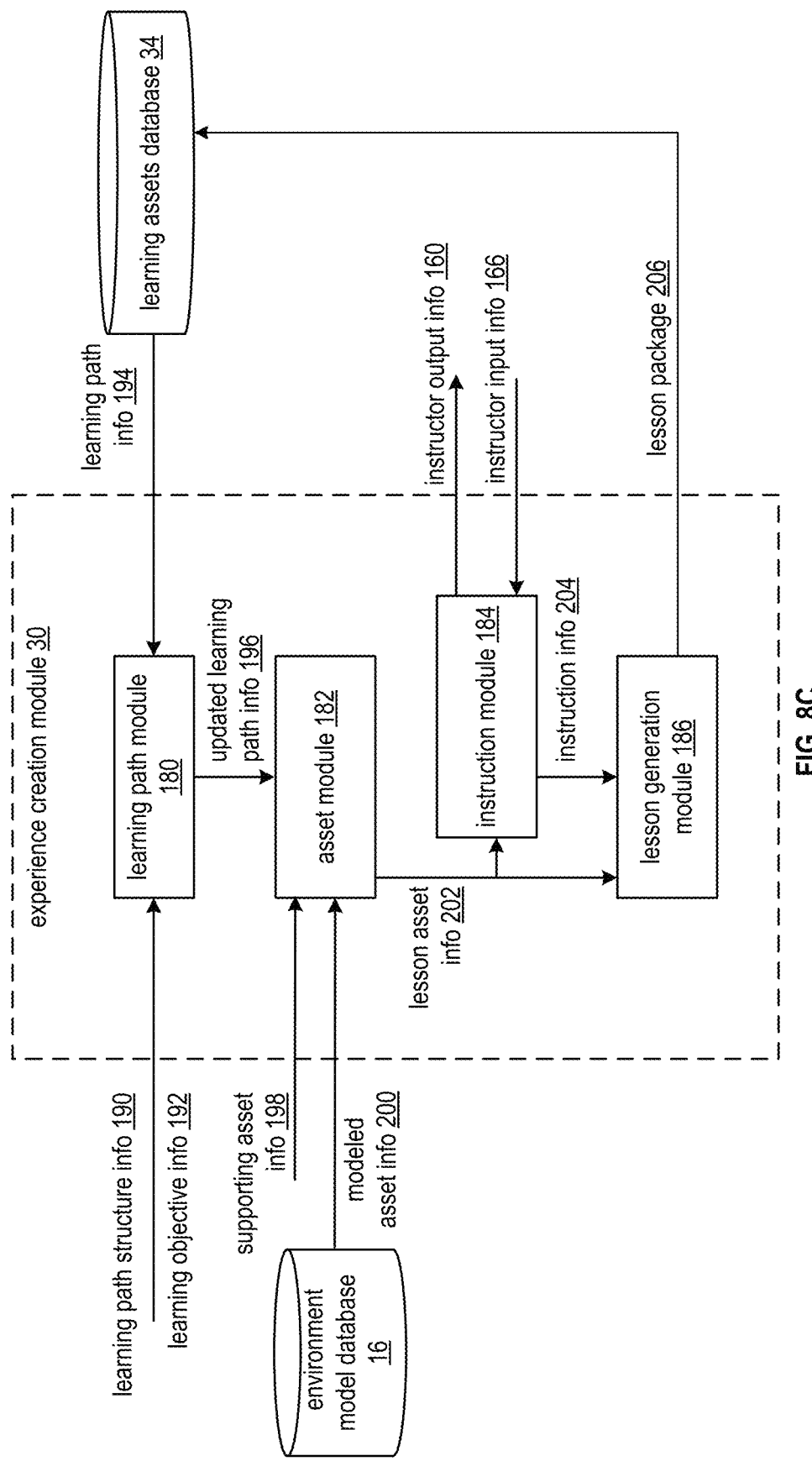

FIGS. 8A-8C are schematic block diagrams of another embodiment of a computing system illustrating an example of creating a learning experience. The computing system includes the environment model database 16, the experience creation module 30, and the learning assets database 34 of FIG. 1. The experience creation module 30 includes a learning path module 180, an asset module 182, an instruction module 184, and a lesson generation module 186.

In an example of operation, FIG. 8A illustrates the learning path module 180 determining a learning path (e.g., structure and ordering of learning objectives to complete towards a goal such as a certificate or degree) to include multiple modules and/or lessons. For example, the learning path module 180 obtains learning path information 194 from the learning assets database 34 and receives learning path structure information 190 and learning objective information 192 (e.g., from an instructor) to generate updated learning path information 196.

The learning path structure information 190 includes attributes of the learning path and the learning objective information 192 includes a summary of desired knowledge to impart. The updated learning path information 196 is generated to include modifications to the learning path information 194 in accordance with the learning path structure information 190 in the learning objective information 192.

The asset module 182 determines a collection of common assets for each lesson of the learning path. For example, the asset module 182 receives supporting asset information 198 (e.g., representation information of objects in the virtual space) and modeled asset information 200 from the environment model database 16 to produce lesson asset information 202. The modeled asset information 200 includes representations of an environment to support the updated learning path information 196 (e.g., modeled places and modeled objects) and the lesson asset information 202 includes a representation of the environment, learning path, the objectives, and the desired knowledge to impart.

FIG. 8B further illustrates the example of operation where the instruction module 184 outputs a representation of the lesson asset information 202 as instructor output information 160. The instructor output information 160 includes a representation of the environment and the asset so far to be experienced by an instructor who is about to input interactions with the environment to impart the desired knowledge.

The instruction module 184 receives instructor input information 166 from the instructor in response to the instructor output information 160. The instructor input information 166 includes interactions from the instructor to facilitate imparting of the knowledge (e.g., instructor annotations, pointer movements, highlighting, text notes, and speech) and testing of comprehension of the knowledge (e.g., valuation information such as questions and correct answers). The instruction module 184 obtains assessment information (e.g., comprehension test points, questions, correct answers to the questions) for each learning objective based on the lesson asset information 202 and produces instruction information 204 (e.g., representation of instructor interactions with objects within the virtual place, evaluation information).

FIG. 8C further illustrates the example of operation where the lesson generation module 186 renders (e.g., as a multi-dimensional representation) the objects associated with each lesson (e.g., assets of the environment) within the environment in accordance with the instructor interactions for the instruction portion and the assessment portion of the learning experience. Each object is assigned a relative position in XYZ world space within the environment to produce the lesson rendering.

The lesson generation module 186 outputs the rendering as a lesson package 206 for storage in the learning assets database 34. The lesson package 206 includes everything required to replay the lesson for a subsequent learner (e.g., representation of the environment, the objects, the interactions of the instructor during both the instruction and evaluation portions, questions to test comprehension, correct answers to the questions, a scoring approach for evaluating comprehension, all of the learning objective information associated with each learning objective of the lesson).

Figure 8D:
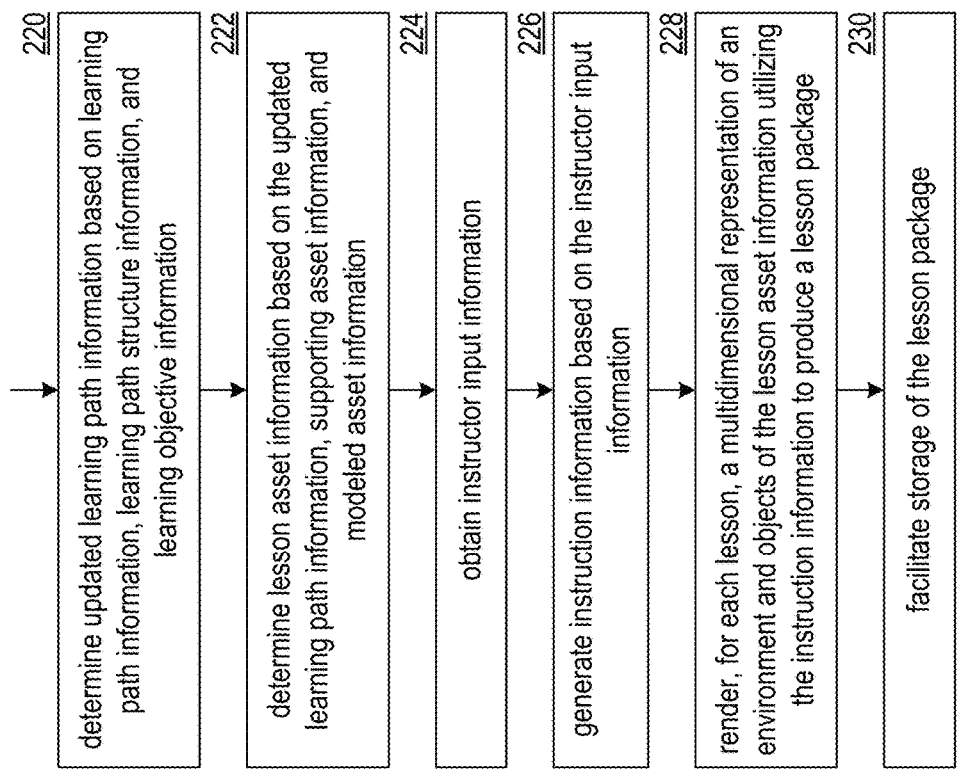
FIG. 8D is a logic diagram of an embodiment of a method for creating a learning experience within a computing system in accordance with the present invention.

FIG. 8D is a logic diagram of an embodiment of a method for creating a learning experience within a computing system (e.g., the computing system 10 of FIG. 1). In particular, a method is presented in conjunction with one or more functions and features described in conjunction with FIGS. 1-7B, and also FIGS. 8A-8C. The method includes step 220 where a processing module of one or more processing modules of one or more computing devices within the computing system determines updated learning path information based on learning path information, learning path structure information, and learning objective information. For example, the processing module combines a previous learning path with obtained learning path structure information in accordance with learning objective information to produce the updated learning path information (i.e., specifics for a series of learning objectives of a lesson).

The method continues at step 222 where the processing module determines lesson asset information based on the updated learning path information, supporting asset information, and modeled asset information. For example, the processing module combines assets of the supporting asset information (e.g., received from an instructor) with assets and a place of the modeled asset information in accordance with the updated learning path information to produce the lesson asset information. The processing module selects assets as appropriate for each learning objective (e.g., to facilitate the imparting of knowledge based on a predetermination and/or historical results).

The method continues at step 224 where the processing module obtains instructor input information. For example, the processing module outputs a representation of the lesson asset information as instructor output information and captures instructor input information for each lesson in response to the instructor output information. Further obtain asset information for each learning objective (e.g., extract from the instructor input information).

The method continues at step 226 where the processing module generates instruction information based on the instructor input information. For example, the processing module combines instructor gestures and further environment manipulations based on the assessment information to produce the instruction information.

The method continues at step 228 where the processing module renders, for each lesson, a multidimensional representation of environment and objects of the lesson asset information utilizing the instruction information to produce a lesson package. For example, the processing module generates the multidimensional representation of the environment that includes the objects and the instructor interactions of the instruction information to produce the lesson package. For instance, the processing module includes a 3-D rendering of a place, background objects, recorded objects, and the instructor in a relative position XYZ world space over time.

The method continues at step 230 where the processing module facilitates storage of the lesson package. For example, the processing module indexes the one or more lesson packages of the one or more lessons of the learning path to produce indexing information (e.g., title, author, instructor identifier, topic area, etc.). The processing module stores the indexed lesson package as learning asset information in a learning assets database.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 8E, 8F, 8G, 8H, 8J, and 8K are schematic block diagrams of another embodiment of a computing system illustrating another example of a method to create a learning experience. The embodiment includes creating a multi-disciplined learning tool regarding a topic. The multi-disciplined aspect of the learning tool includes both disciplines of learning and any form/format of presentation of content regarding the topic. For example, a first discipline includes mechanical systems, a second discipline includes electrical systems, and a third discipline includes fluid systems when the topic includes operation of a combustion based engine. The computing system includes the environment model database 16 of FIG. 1, the learning assets database 34 of FIG. 1, and the experience creation module 30 of FIG. 1.

Figure 8E:
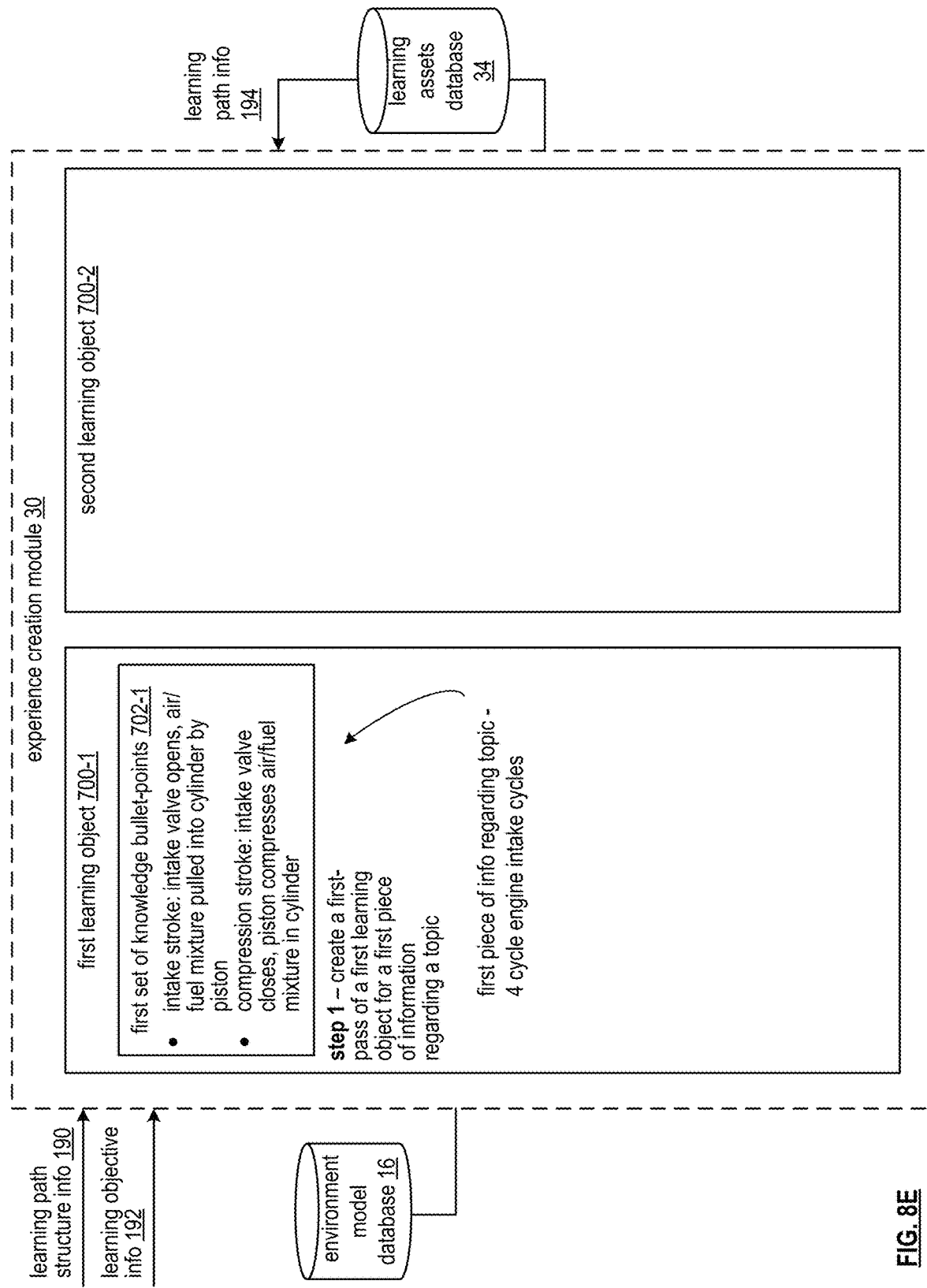

FIG. 8E illustrates the example of operation where the experience creation module 30 creates a first-pass of a first learning object 700-1 for a first piece of information regarding the topic to include a first set of knowledge bullet-points 702-1 regarding the first piece of information. The creating includes utilizing guidance from an instructor and/or reusing previous knowledge bullet-points for a related topic. For example, the experience creation module 30 extracts the bullet-points from one or more of learning path structure information 190 and learning objective information 192 when utilizing the guidance from the instructor. As another example, the experience creation module 30 extracts the bullet-points from learning path information 194 retrieved from the learning assets database 34 when utilizing previous knowledge bullet-points for the related topic.

Each piece of information is to impart additional knowledge related to the topic. The additional knowledge of the piece of information includes a characterization of learnable material by most learners in just a few minutes. As a specific example, the first piece of information includes "4 cycle engine intake cycles" when the topic includes "how a 4 cycle engine works."

Each of the knowledge bullet-points are to impart knowledge associated with the associated piece of information in a logical (e.g., sequential) and knowledge building fashion. As a specific example, the experience creation module 30 creates the first set of knowledge bullet-points 702-1 based on instructor input to include a first bullet-point "intake stroke: intake valve opens, air/fuel mixture pulled into cylinder by piston" and a second bullet-point "compression stroke: intake valve closes, piston compresses air/fuel mixture in cylinder" when the first piece of information includes the "4 cycle engine intake cycles."

Figure 8F:
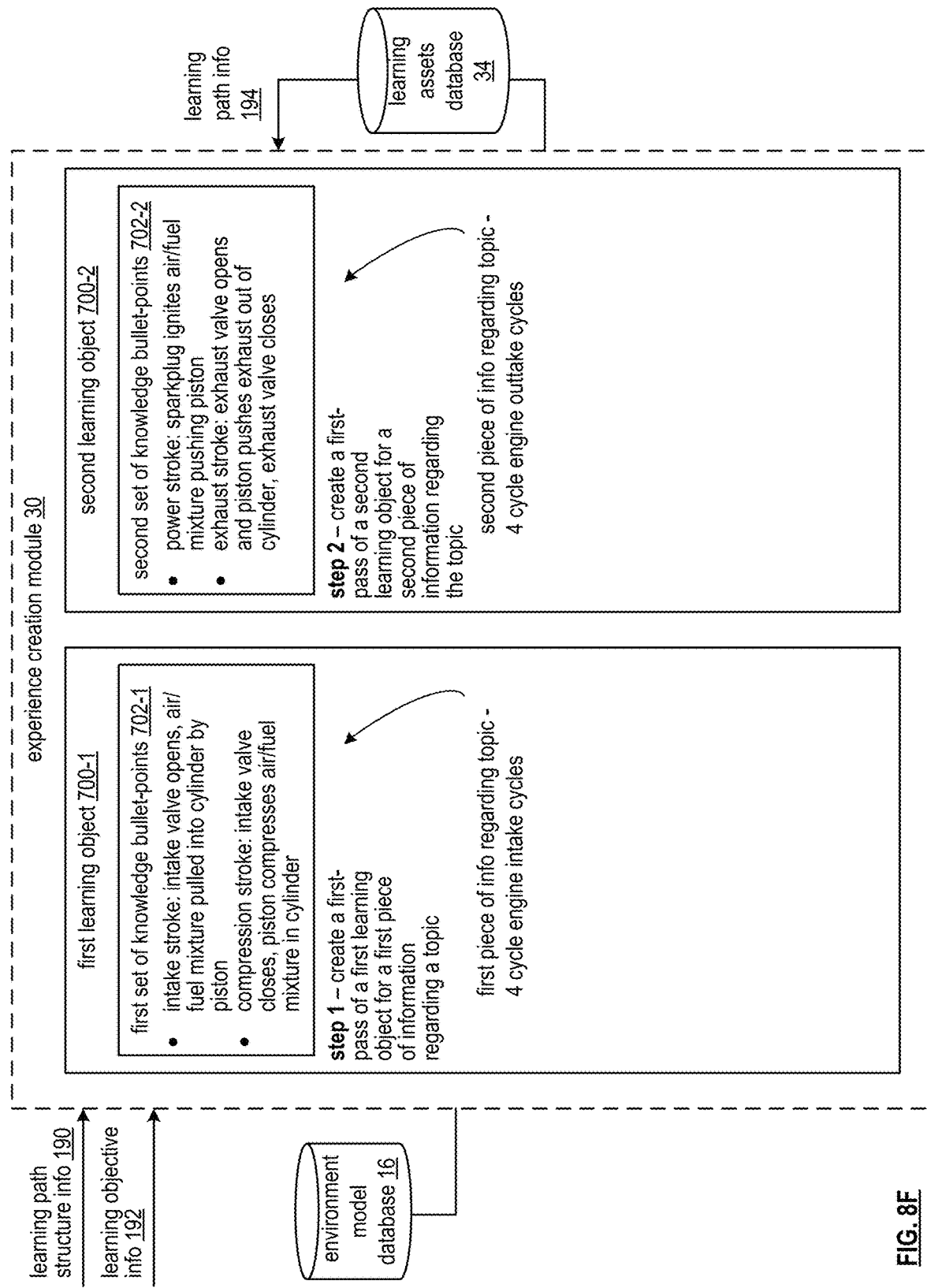

FIG. 8F further illustrates the example of operation where the experience creation module 30 creates a first-pass of a second learning object 700-2 for a second piece of information regarding the topic to include a second set of knowledge bullet-points 702-2 regarding the second piece of information. As a specific example, the experience creation module 30 creates the second set of knowledge bullet-points 702-2 based on the instructor input to include a first bullet-point "power stroke: spark plug ignites air/fuel mixture pushing piston" and a second bullet-point "exhaust stroke: exhaust valve opens and piston pushes exhaust out of cylinder, exhaust valve closes" when the second piece of information includes "4 cycle engine outtake cycles."

Figure 8G:
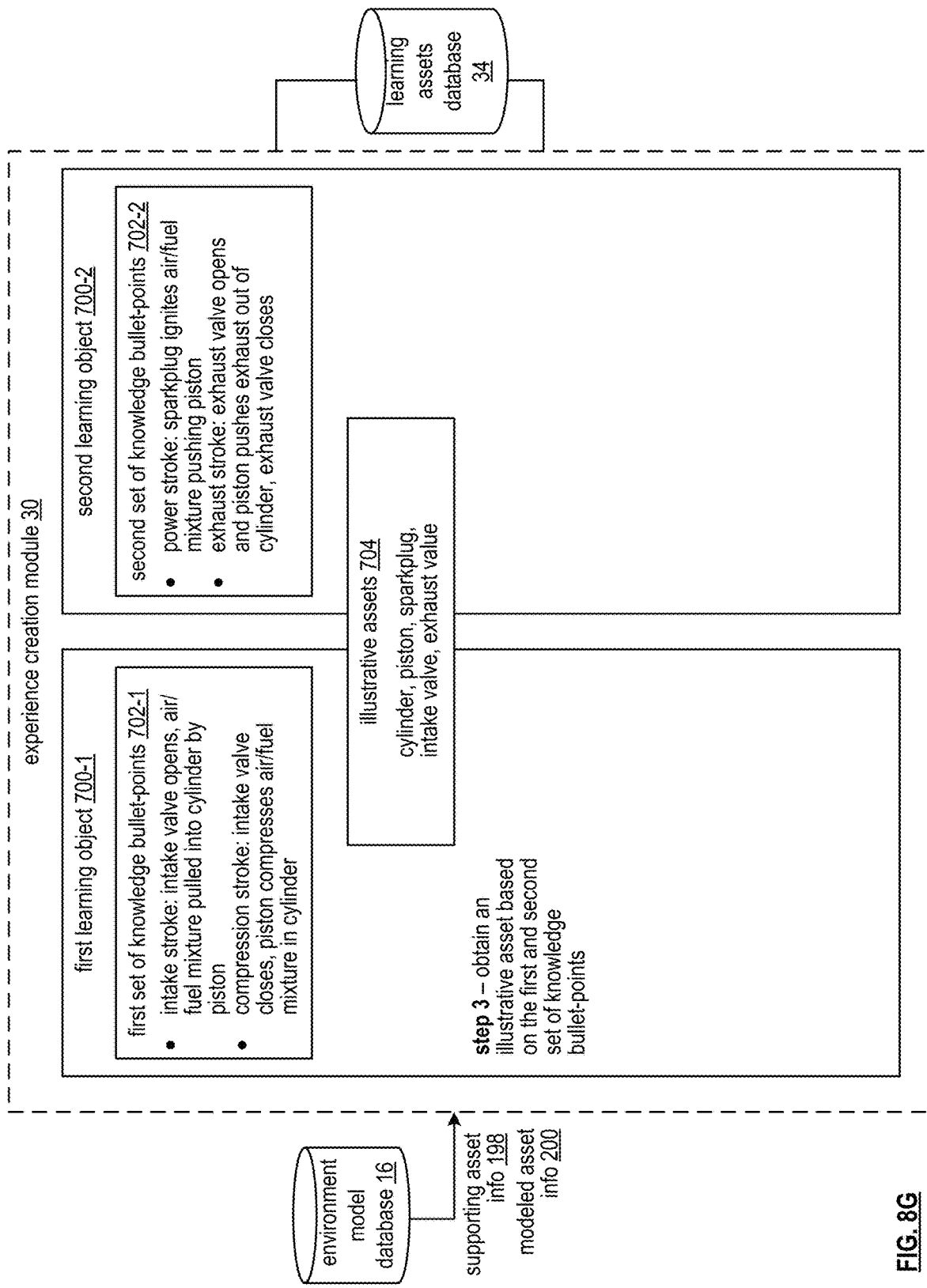

FIG. 8G further illustrates the example of operation where the experience creation module 30 obtains illustrative assets 704 based on the first and second set of knowledge bullet-points 702-1 and 702-2. The illustrative assets 704 depicts one or more aspects regarding the topic pertaining to the first and second pieces of information. Examples of illustrative assets includes background environments, objects within the environment (e.g., things, tools), where the objects and the environment are represented by multidimensional models (e.g., 3-D model) utilizing a variety of representation formats including video, scans, images, text, audio, graphics etc.

The obtaining of the illustrative assets 704 includes a variety of approaches. A first approach includes interpreting instructor input information to identify the illustrative asset. For example, the experience creation module 30 interprets instructor input information to identify a cylinder asset.

A second approach includes identifying a first object of the first and second set of knowledge bullet-points as an illustrative asset. For example, the experience creation module 30 identifies the piston object from both the first and second set of knowledge bullet-points.

A third approach includes determining the illustrative assets 704 based on the first object of the first and second set of knowledge bullet-points. For example, the experience creation module 30 accesses the environment model database 16 to extract information about an asset from one or more of supporting asset information 198 and modeled asset information 200 for a sparkplug when interpreting the first and second set of knowledge bullet-points.

FIG. 8H further illustrates the example of operation where the experience creation module 30 creates a second-pass of the first learning object 700-1 to further include first descriptive assets 706-1 regarding the first piece of information based on the first set of knowledge bullet-points 702-1 and the illustrative assets 704. Descriptive assets include instruction information that utilizes the illustrative asset 704 to impart knowledge and subsequently test for knowledge retention. The embodiments of the descriptive assets includes multiple disciplines and multiple dimensions to provide improved learning by utilizing multiple senses of a learner. Examples of the instruction information includes annotations, actions, motions, gestures, expressions, recorded speech, speech inflection information, review information, speaker notes, and assessment information.

The creating the second-pass of the first learning object 700-1 includes generating a representation of the illustrative assets 704 based on a first knowledge bullet-point of the first set of knowledge bullet-points 702-1. For example, the experience creation module 30 renders 3-D frames of a 3-D model of the cylinder, the piston, the spark plug, the intake valve, and the exhaust valve in motion when performing the intake stroke where the intake valve opens and the air/fuel mixture is pulled into the cylinder by the piston.

The creating of the second-pass of the first learning object 700-1 further includes generating the first descriptive assets 706-1 utilizing the representation of the illustrative assets 704. For example, the experience creation module 30 renders 3-D frames of the 3-D models of the various engine parts without necessarily illustrating the first set of knowledge bullet-points 702-1.

In an embodiment where the experience creation module 30 generates the representation of the illustrative assets 704, the experience creation module 30 outputs the representation of the illustrative asset 704 as instructor output information 160 to an instructor. For example, the 3-D model of the cylinder and associated parts.

The experience creation module 30 receives instructor input information 166 in response to the instructor output information 160. For example, the instructor input information 166 includes instructor annotations to help explain the intake stroke (e.g., instructor speech, instructor pointer motions). The experience creation module 30 interprets the instructor input information 166 to produce the first descriptive assets 706-1. For example, the renderings of the engine parts include the intake stroke as annotated by the instructor.

Figure 8J:
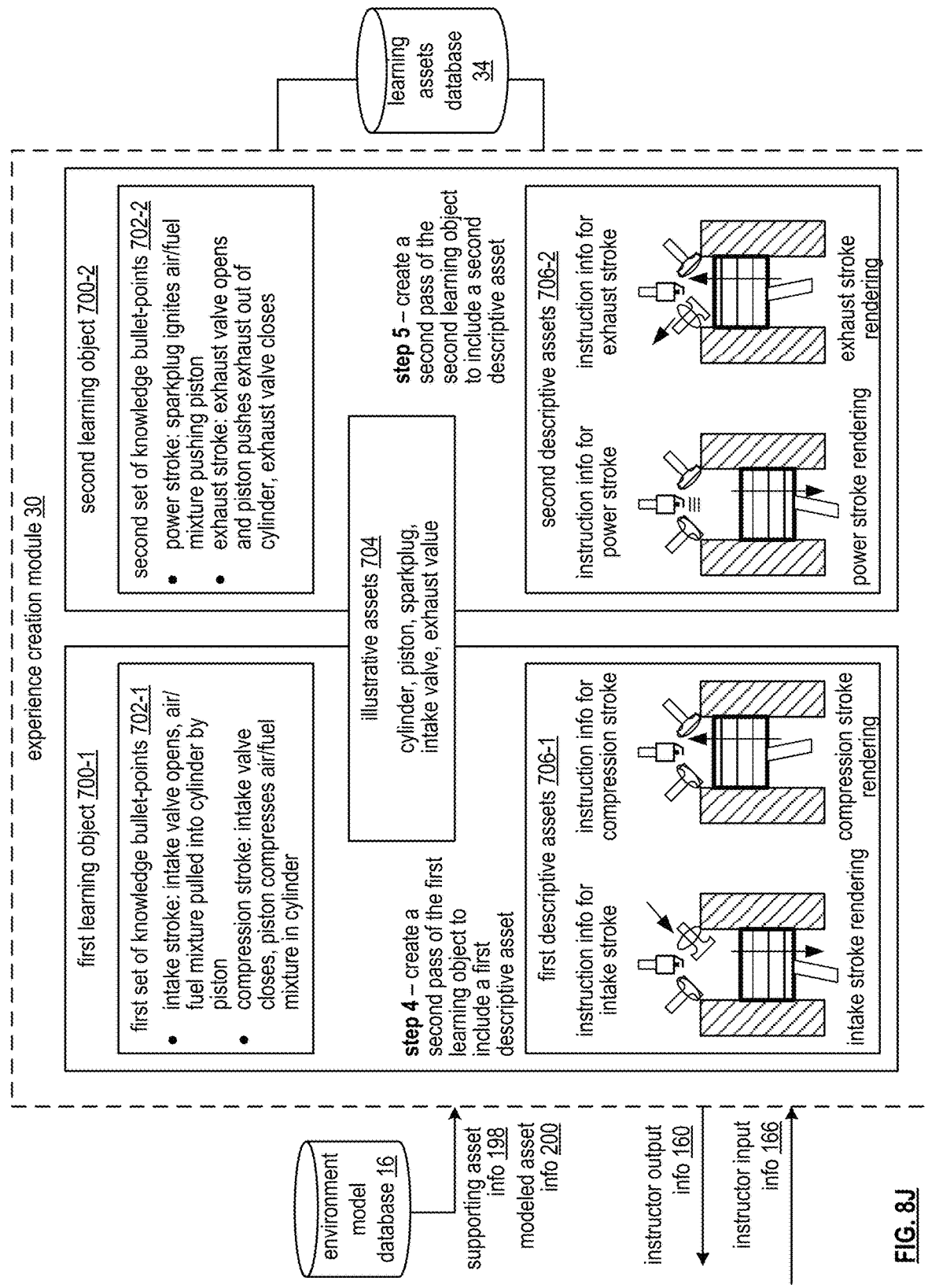

FIG. 8J further illustrates the example of operation where the experience creation module 30 creates a second-pass of the second learning object 700-2 to further include second descriptive assets 706-2 regarding the second piece of information based on the second set of knowledge bullet-points 702-2 and the illustrative assets 704. For example, the experience creation module 30 creates 3-D renderings of the power stroke and the exhaust stroke as annotated by the instructor based on further instructor input information 166.

Figure 8K:
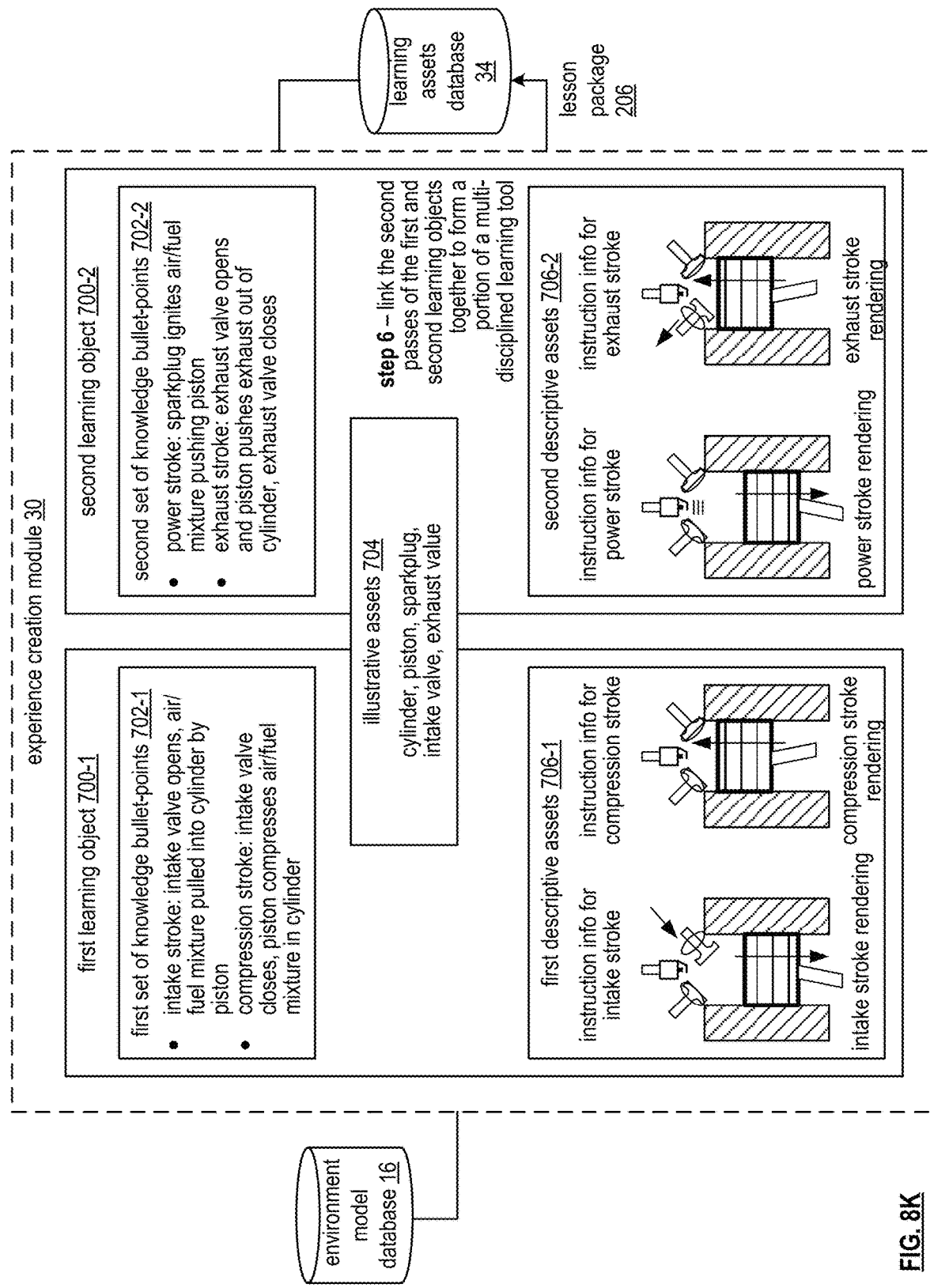

FIG. 8K further illustrates the example of operation where the experience creation module 30 links the second-passes of the first and second learning objects 700-1 and 700-2 together to form at least a portion of the multi-disciplined learning tool. For example, the experience creation module 30 aggregates the first learning object 700-1 and the second learning object 700-2 to produce a lesson package 206 for storage in the learning assets database 34.

In an embodiment, the linking of the second-passes of the first and second learning objects 700-1 and 700-2 together to form the at least the portion of the multi-disciplined learning tool includes generating index information for the second-passes of first and second learning objects to indicate sharing of the illustrative asset 704. For example, the experience creation module 30 generates the index information to identify the first learning object 700-1 and the second learning object 700-2 as related to the same topic.

The linking further includes facilitating storage of the index information and the first and second learning objects 700-1 and 700-2 in the learning assets database 34 to enable subsequent utilization of the multi-disciplined learning tool. For example, the experience creation module 30 aggregates the first learning object 700-1, the second learning object 700-2, and the index information to produce the lesson package 206 for storage in the learning assets database 34.

The method described above with reference to FIGS. 8E-8K in conjunction with the experience creation module 30 can alternatively be performed by other modules of the computing system 10 of FIG. 1 or by other devices including various embodiments of the computing entity 20 of FIG. 2A. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause the one or more computing devices to perform any or all of the method steps described above.

FIG. 9A is a schematic block diagram of a data structure for a smart contract 300 that includes object information 302 and license terms 304. The object information 302 includes object basics (e.g., including links to blockchains and electronic assets), available license terms, and available patent terms. FIG. 9A illustrates examples of each category of the object information 302. Examples of an object of the object information 302 that are associated with training and education offerings include a university course, an education curriculum, an education degree, a training program, a training session, a lesson, a lesson package, and a learning object. Examples of the object of the object information 302 that are associated with a student include a person, a group of students, a class, people that work for a common employer, etc.

The license terms 304 includes licensee information, agreed license terms, and agreed payment terms. FIG. 9A further illustrates examples of each of the categories of the license terms 304.

FIGS. 9B and 9C are schematic block diagrams of organization of object distributed ledgers. FIG. 9B illustrates an example where a single blockchain serves as the object distributed ledger linking a series of blocks of the blockchain, where each block is associated with a different license (e.g., use of training) for a training object associated with a non-fungible token. FIG. 9C illustrates another example where a first blockchain links a series of blocks of different non-fungible tokens for different sets of training object licenses. Each block forms a blockchain of its own where each further block of its own is associated with a different license for the set of training objects of the non-fungible token.

FIG. 9D is a schematic block diagram of an embodiment of content blockchain of an object distributed ledger, where the content includes the smart contract as previously discussed. The content blockchain includes a plurality of blocks 2-4. Each block includes a header section and a transaction section. The header section includes one or more of a nonce, a hash of a preceding block of the blockchain, where the preceding block was under control of a preceding device (e.g., a broker computing device, a user computing device, a blockchain node computing device, etc.) in a chain of control of the blockchain, and a hash of a current block (e.g., a current transaction section), where the current block is under control of a current device in the chain of control of the blockchain.

The transaction section includes one or more of a public key of the current device, a signature of the preceding device, smart contract content, change of control from the preceding device to the current device, and content information from the previous block as received by the previous device plus content added by the previous device when transferring the current block to the current device.

FIG. 9D further includes devices 2-3 to facilitate illustration of generation of the blockchain. Each device includes a hash function, a signature function, and storage for a public/private key pair generated by the device.

An example of operation of the generating of the blockchain, when the device 2 has control of the blockchain and is passing control of the blockchain to the device 3 (e.g., the device 3 is transacting a transfer of content from device 2), the device 2 obtains the device 3 public key from device 3, performs a hash function 2 over the device 3 public key and the transaction 2 to produce a hashing resultant (e.g., preceding transaction to device 2) and performs a signature function 2 over the hashing resultant utilizing a device 2 private key to produce a device 2 signature.

Having produced the device 2 signature, the device 2 generates the transaction 3 to include the device 3 public key, the device 2 signature, device 3 content request to 2 information, and the previous content plus content from device 2. The device 3 content request to device 2 information includes one or more of a detailed content request, a query request, background content, and specific instructions from device 3 to device 2 for access to a patent license. The previous content plus content from device 2 includes one or more of content from an original source, content from any subsequent source after the original source, an identifier of a source of content, a serial number of the content, an expiration date of the content, content utilization rules, and results of previous blockchain validations.

Having produced the transaction 3 section of the block 3 a processing module (e.g., of the device 2, of the device 3, of a transaction mining server, of another server), generates the header section by performing a hashing function over the transaction section 3 to produce a transaction 3 hash, performing the hashing function over the preceding block (e.g., block 2) to produce a block 2 hash. The performing of the hashing function may include generating a nonce such that when performing the hashing function to include the nonce of the header section, a desired characteristic of the resulting hash is achieved (e.g., a desired number of preceding zeros is produced in the resulting hash).

Having produced the block 3, the device 2 sends the block 3 to the device 3, where the device 3 initiates control of the blockchain. Having received the block 3, the device 3 validates the received block 3. The validating includes one or more of verifying the device 2 signature over the preceding transaction section (e.g., transaction 2) and the device 3 public key utilizing the device 2 public key (e.g., a re-created signature function result compares favorably to device 2 signature) and verifying that an extracted device 3 public key of the transaction 3 compares favorably to the device 3 public key held by the device 3. The device 3 considers the received block 3 validated when the verifications are favorable (e.g., the authenticity of the associated content is trusted).

FIGS. 10A, 10B, and 10C are schematic block diagrams of an embodiment of a computing system illustrating an example of generating a virtual reality environment. The computing system includes the human interface module 18 of FIG. 1, the experience creation module 30 of FIG. 1, the learning assets database 34 FIG. 1, and the environment model database 16 of FIG. 1.

FIG. 10A illustrates an example method of operation of the generating the virtual reality environment utilizing a group of object representations in accordance with interaction information for at least some of the object representations of the group of object representations. At least some of the object representations are associated with corresponding three dimensional (3-D) physical objects. The interaction information includes 3-D models and position information for the at least some of the object representations of the group of object representations. A first set of object representations of the group of object representations is associated with a first piece of information regarding the topic. A second set of object representations of the group of object representations is associated with a second piece of information regarding the topic, A first step of the example method of operation includes the experience creation module 30 obtaining the first and second pieces of information for the topic. The obtaining includes creating first and second sets of knowledge bullet-points of a plurality of learning objects for the topic. A first learning object of the plurality of learning objects includes a first set of knowledge bullet-points for a first piece of information regarding the topic. A second learning object of the plurality of learning objects includes a second set of knowledge bullet-points for a second piece of information regarding the topic. For example, the experience creation module 30 receives instructor input information 166, through an appropriate user interface, from the human interface module 18 in response to human input 164 from an instructor when the topic is how a four stroke internal combustion engine operates. The experience creation module 30 interprets instructor input information 166 to generate the first set of knowledge bullet-points 702-1 to include "intake stroke: intake valve opens, air/fuel mixture pulled into cylinder by piston; compression stroke: intake valve closes, piston compresses air/fuel mixture in cylinder."

The experience creation module 30 interprets further instructor input information 166 to generate the second set of knowledge bullet-points 702-2. For example, the experience creation module 30 generates the second set of knowledge bullet-points to include "power stroke: sparkplug ignites air/fuel mixture pushing piston; exhaust stroke: exhaust valve opens and piston pushes exhaust out of cylinder, exhaust valve closes".

A second step of the example method of operation includes the experience creation module 30 identifying a set of common illustrative assets as illustrative assets 704 based on the first and second set of object representations. The set of common illustrative assets belongs to the first and second sets of object representations and depict one or more aspects regarding the topic pertaining to the first and second pieces of information.

The identifying the set of common illustrative assets includes a variety of approaches. A first approach includes interpreting instructor input information to identify the common illustrative assets. For example, the experience creation module 30 interprets instructor input information 166 to extract the common illustrative assets.

A second approach includes identifying a common object representation of the first and second sets of object representations as the set of common illustrative assets. For example, the experience creation module 30 determines that the piston asset is common to both the first and second sets of object representations. As another example, the experience creation module 30 interprets the first and second set of knowledge bullet-points to identify common objects to produce the illustrative asset 704. For instance, the experience creation module 30 generates the illustrative asset 704 to include cylinder, piston, sparkplug, intake valve, exhaust valve.

A third step of the example method of operation includes the experience creation module 30 obtaining object representations for the topic by determining a preliminary set of lesson assets 705 based on the first and second learning objects so far and modeled asset information 200. The preliminary set of lesson assets includes a first descriptive asset associated with the first set of knowledge bullet-points and a second descriptive asset associated with the second set of knowledge bullet-points. The first learning object further includes a first descriptive asset regarding the first piece of information based on the first set of knowledge bullet-points and illustrative assets 704. The second learning object further includes a second descriptive asset regarding the second piece of information based on the second set of knowledge bullet-points and the common illustrative assets.

For example, the experience creation module 30 determines the preliminary set of lesson asset 705 to include instructions for each of the four strokes (e.g., part of the bullet-points). The preliminary set of lesson asset 705 further includes engine depiction assets for each of the four strokes that utilize the common illustrative assets 704 and utilize models of the internal combustion engine from the modeled asset information 200.

Alternatively, or in addition to, the experience creation module 30 produces the object representations via a series of sub-steps. A first sub-step includes the experience creation module outputting a representation of a set of common illustrative assets as instructor output information. For example, descriptions of the cylinder, the piston, the spark plug, the intake valve, and the exhaust valve.

A second sub-step includes receiving instructor input information 166 in response to the instructor output information. For example, the instructor input information 166 includes guidance with regards to how the common illustrative assets operate together to produce the four strokes of the engine.

A third sub-step includes interpreting the instructor input information 166 to produce at least some of the group of object representations as the preliminary set of lesson assets 705. For example, the experience creation module 30 generates the preliminary set of lesson assets 705 to include instruction information for each of the four strokes utilizing the common illustrative assets.

Further alternatively, or further in addition to, the experience creation module 30 produces the group of object representations via a series of operations. A first operation includes the experience creation module 30 interpreting the first set of knowledge bullet points of the topic to produce the first piece of information regarding the topic. For example, the experience creation module 30 interprets the intake and compression strokes bullet points to produce the first piece of information with regards to preparing the cylinder for firing.

A second operation includes the experience creation module 30 obtaining the first set of object representations based on the first piece of information regarding the topic. For example, the experience creation module 30 identifies the first set of object representations from modeled asset information 200 from the environment model database 16 based on the first piece of information for preparing the cylinder for firing.

A third operation includes the experience creation module 30 interpreting the second set of knowledge bullet points of the topic to produce the second piece of information regarding the topic. For example, the experience creation module 30 interprets the power and exhaust strokes bullet points to produce the second piece of information with regards to firing the cylinder.

A fourth operation includes the experience creation module 30 obtaining the second set of object representations based on the second piece of information regarding the topic. For example, the experience creation module 30 identifies the second set of object representations from the modeled asset information 200 based on the second piece of information for firing the cylinder.

FIG. 10B further illustrates the example method of operation for generating the virtual reality environment where a fourth step includes the experience creation module 30 determining a priority asset 707 of the set of common illustrative assets. The priority asset is associated with an importance status level that is greater than an importance status threshold level with regards to the topic. The priority assets are associated with a focus of the lesson package of the virtual reality environment and are considered to be of higher importance than other assets. For example, the experience creation module 30 identifies the piston object as the priority asset when the piston is included in each of the bullet-points.

The determining the priority asset of the set of common illustrative assets includes a series of sub-steps. A first sub-step includes determining a first importance status level of a first common illustrative asset of the set of common illustrative assets for example, the experience creation module 30 interprets modeled asset information 200 with regards to the piston object to reveal the first importance status level of the piston object.

A second sub-step includes comparing the first importance status level to the importance status threshold level with regards to the topic. For example, the experience creation module 30 interprets the modeled asset information 200 with regards to the topic to reveal the importance status threshold level with regards to the engine operation topic. The experience creation module 30 compares the importance status level of the piston to the importance status level threshold with regards to the engine topic.

A third sub-step includes establishing the first common illustrative asset as the priority asset when the first importance status level is greater than the importance status threshold level with regards to the topic. For example, the experience creation module 30 establishes the piston asset as the priority asset when the importance status level of the piston is greater than the importance status threshold level.

Having established the priority asset, a fifth step of the example method of operation of generating the virtual reality environment includes the experience creation module 30 rendering the priority asset utilizing a first level of resolution to produce a set of priority asset video frames. The first level resolution includes a higher than others resolution level to produce an improved representation of the priority piston object to promote improved information retention. For example, the experience creation module 30 renders the priority piston object with a higher resolution level than others to produce the set of priority asset video frames with regards to the piston.

The fifth step of the example method of operation further includes the experience creation module 30 selecting a subset of the set of priority asset video frames to produce a common portion of video frames for the virtual reality environment with regards to the first and second sets of object representations to reduce duplicative rendering. For example, the experience creation module 30 selects certain frames of the priority asset video frames that are expected to be utilized to represent both the first and second pieces of information such that re-rendering of those frames is unnecessary to abate unnecessary utilization of processing power of the experience creation module 30.

The selecting the subset of the set of priority asset video frames to produce the common portion of video frames for the virtual reality environment with regards to the first and second sets of object representations includes a series of sub-steps. A first sub-step includes the experience creation module 30 identifying a first priority asset video frame of the set of priority asset video frames that represents a first aspect of the first set of object representations. For example, the experience creation module 30 identifies a frame of the piston within the cylinder of the first set of object representations.

A second sub-step includes the experience creation module 30 identifying a second priority asset video frame of the set of priority asset video frames that represents a second aspect of the second set of object representations. For example, the experience creation module 30 identifies another piston frame once again within the cylinder of the second set of object representations A third sub-step includes the experience creation module 30 establishing the common portion of video frames to include the first priority asset video frame when more than a minimum threshold number of pixels of the first and second priority asset video frames are the same. For example, the experience creation module compares pixels of the frame of the piston with pixels of the other piston frame and establishes the common portion of the video frames to include the frame of the piston when more than the minimum threshold number of pixels of the comparison of the same.

The fifth step of the example method of operation further includes the experience creation module 30 rendering another representation of the first set of object representations utilizing a second level of resolution to produce a first remaining portion of the video frames for the virtual reality environment with regards to the first set of object representations. The second level of resolution is a lower video resolution level than the first level of resolution. The lower resolution level is suitable for less important aspects of the virtual reality environment with regards to information retention. Utilizing a lower resolution can help to save processing power in both the creation of the video frames and the subsequent displaying of the video frames. The remaining portion of the video frames with regards to the first set of object representations is associated with further aspects that are not covered by the priority asset video frames. For, the experience creation module 30 renders the other representation of the first set of object representations utilizing the second level resolution to produce the first remaining portion of video frames associated with the spark plug, the valves opening and closing, and the piston moving through the cylinder during the preparation to fire of the intake and compression strokes.

The fifth step of the example method of operation further includes the experience creation module 30 rendering another representation of the second set of object representations utilizing the second level of resolution to produce a second remaining portion of the video frames for the virtual reality environment with regards to the second set of object representations. For example, the experience creation module 30 renders the other representation of the second set of object representations utilizing the second-level resolution to produce the second remaining portion of video frames with regards to the spark plug firing, the valves opening and closing, and the piston moving through the cylinder during the firing and exhaust strokes.

FIG. 10C further illustrates the example method of operation of the generating the virtual reality environment, where, having produced video frames for the virtual reality environment, a sixth step includes the experience creation module 30 linking the common portion, the first remaining portion, and the second remaining portion of the video frames to produce the virtual reality environment. For example, the experience creation module 30 creates a set of lesson assets 711 from the video frames and the preliminary set of lesson assets. For instance, the experience creation module 30 combines the preliminary set of lesson assets with the video frames of the common portion, the first remaining portion, and the second remaining portion to produce the set of lesson asset 711 as the virtual reality environment. Alternatively, or in addition to, the experience creation module 30 combines the preliminary set of lesson assets with the video frames to produce a lesson package 206 for storage in the learning assets database 34.

Having generated the set of lesson assets 711, a seventh step of the example method of operation to generate the virtual reality environment includes the experience creation module 30 outputting the set of lesson asset 711 as a lesson package 206 for interactive consumption. For example, the experience creation module 30 utilizes the high-resolution video frames and the low resolution video frames for the objects to generate the lesson asset video frames 713. Having generated the lesson asset video frames 713, the experience creation module 30 outputs learner output information 172 to the human interface module 18, where the learner output information 172 includes the lesson asset video frames 713. The human interface module 18 outputs human output 162 to a student to interactively consume the lesson package.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 11A, 11B, and 11C are schematic block diagrams of an embodiment of a computing system illustrating an example of generating multiple resolutions of a virtual reality environment. The computing system includes the human interface module 18 of FIG. 1, the experience creation module 30 of FIG. 1, the experience execution module 32 of FIG. 1 (e.g., of FIG. 11C), the learning assets database 34 FIG. 1, and the environment model database 16 of FIG. 1.

FIG. 11A illustrates an example method of operation of the generating of the multiple resolutions of the virtual reality environment where a first step includes the experience creation module 30 generating the virtual reality environment utilizing a group of object representations in accordance with interaction information for at least some of the object representations of the group of object representations. At least some of the object representations are associated with corresponding three dimensional (3-D) physical objects. The interaction information includes 3-D models and position information for the at least some of the object representations of the group of object representations. A first set of object representations of the group of object representations is associated with a first piece of information regarding a topic. A second set of object representations of the group of object representations is associated with a second piece of information regarding the topic.

A first step of the example method of operation includes the experience creation module 30 obtaining the first and second pieces of information for the topic. The obtaining includes creating first and second sets of knowledge bullet-points of a plurality of learning objects for the topic. A first learning object of the plurality of learning objects includes a first set of knowledge bullet-points for a first piece of information regarding the topic. A second learning object of the plurality of learning objects includes a second set of knowledge bullet-points for a second piece of information regarding the topic. For example, the experience creation module 30 receives instructor input information 166, through an appropriate user interface, from the human interface module 18 in response to human input 164 from an instructor when the topic is how a four stroke internal combustion engine operates. The experience creation module 30 interprets instructor input information 166 to generate the first set of knowledge bullet-points 702-1 to include "intake stroke: intake valve opens, air/fuel mixture pulled into cylinder by piston; compression stroke: intake valve closes, piston compresses air/fuel mixture in cylinder."

The experience creation module 30 interprets further instructor input information 166 to generate the second set of knowledge bullet-points 702-2. For example, the experience creation module 30 generates the second set of knowledge bullet-points to include "power stroke: sparkplug ignites air/fuel mixture pushing piston; exhaust stroke: exhaust valve opens and piston pushes exhaust out of cylinder, exhaust valve closes".

A second step of the example method of operation includes the experience creation module 30 obtaining object representations for the topic by determining a preliminary set of lesson assets 705 based on the first and second learning objects so far and modeled asset information 200. The preliminary set of lesson assets includes a first descriptive asset associated with the first set of knowledge bullet-points and a second descriptive asset associated with the second set of knowledge bullet-points. The first learning object further includes a first descriptive asset regarding the first piece of information based on the first set of knowledge bullet-points and illustrative assets 704. The second learning object further includes a second descriptive asset regarding the second piece of information based on the second set of knowledge bullet-points and the common illustrative assets.

For example, the experience creation module 30 determines the preliminary set of lesson asset 705 to include instructions for each of the four strokes (e.g., part of the bullet-points). The preliminary set of lesson asset 705 further includes engine depiction assets for each of the four strokes that utilize the common illustrative assets 704 and utilize models of the internal combustion engine from the modeled asset information 200.

Alternatively, or in addition to, the experience creation module 30 produces the object representations via a series of sub-steps. A first sub-step includes the experience creation module outputting a representation of a set of common illustrative assets as instructor output information. For example, descriptions of the cylinder, the piston, the spark plug, the intake valve, and the exhaust valve.

A second sub-step includes receiving instructor input information 166 in response to the instructor output information. For example, the instructor input information 166 includes guidance with regards to how the common illustrative assets operate together to produce the four strokes of the engine.

A third sub-step includes interpreting the instructor input information 166 to produce at least some of the group of object representations as the preliminary set of lesson assets 705. For example, the experience creation module 30 generates the preliminary set of lesson assets 705 to include instruction information for each of the four strokes utilizing the common illustrative assets.

Further alternatively, or further in addition to, the experience creation module 30 produces the group of object representations via a series of operations. A first operation includes the experience creation module 30 interpreting the first set of knowledge bullet points of the topic to produce the first piece of information regarding the topic. For example, the experience creation module 30 interprets the intake and compression strokes bullet points to produce the first piece of information with regards to preparing the cylinder for firing.

A second operation includes the experience creation module 30 obtaining the first set of object representations based on the first piece of information regarding the topic. For example, the experience creation module 30 identifies the first set of object representations from modeled asset information 200 from the environment model database 16 based on the first piece of information for preparing the cylinder for firing.

A third operation includes the experience creation module 30 interpreting the second set of knowledge bullet points of the topic to produce the second piece of information regarding the topic. For example, the experience creation module 30 interprets the power and exhaust strokes bullet points to produce the second piece of information with regards to firing the cylinder.

A fourth operation includes the experience creation module 30 obtaining the second set of object representations based on the second piece of information regarding the topic. For example, the experience creation module 30 identifies the second set of object representations from the modeled asset information 200 based on the second piece of information for firing the cylinder.

Having obtained the object representations for the topic, a third step of the example method of operation includes the experience creation module 30 identifying a set of common illustrative assets as illustrative assets 704 based on the first and second set of object representations. The set of common illustrative assets belongs to the first and second sets of object representations and depict one or more aspects regarding the topic pertaining to the first and second pieces of information.

The identifying the set of common illustrative assets includes a variety of approaches. A first approach includes interpreting instructor input information to identify the common illustrative assets. For example, the experience creation module 30 interprets instructor input information 166 to extract the common illustrative assets.

A second approach includes identifying a common object representation of the first and second sets of object representations as the set of common illustrative assets. For example, the experience creation module 30 determines that the piston asset is common to both the first and second sets of object representations. As another example, the experience creation module 30 interprets the first and second set of knowledge bullet-points to identify common objects to produce the illustrative asset 704. For instance, the experience creation module 30 generates the illustrative asset 704 to include cylinder, piston, sparkplug, intake valve, exhaust valve.

FIG. 11B further illustrates the example method of operation of the generating of the multiple resolutions of the virtual reality environment, where, having produce the set of common illustrative assets, a fourth step includes the experience creation module 30 producing the first level resolution video frames for the virtual reality environment. The producing of the first level of resolution of the virtual reality environment includes a series of operations. A first operation includes rendering the set of common illustrative assets utilizing a first level of resolution to produce a set of common illustrative assets video frames. For example, the experience creation module 30 renders, utilizing the first level of resolution, object representations for the cylinder, the piston, the valves, and the spark plug to produce a preliminary set of asset video frames 709.

A second operation includes selecting a subset of the set of common illustrative assets video frames to produce a common portion of video frames for the virtual reality environment with regards to the first and second sets of object representations to reduce duplicative rendering. The selecting the subset of the set of common illustrative assets video frames to produce the common portion of video frames for the virtual reality environment with regards to the first and second sets of object representations includes a series of sub-steps. A first sub-step includes identifying a first priority asset video frame of the set of common illustrative assets video frames that represents a first aspect of the first set of object representations. For instance, a frame of the piston. A second sub-step includes identifying a second priority asset video frame of the set of priority asset video frames that represents a second aspect of the second set of object representations. For instance, another frame of the piston. A third sub-step includes establishing the common portion of video frames to include the first priority asset video frame when more than a minimum threshold number of pixels of the first and second priority asset video frames are the same. For instance, the first priority asset video frame is established when it is substantially the same as the second priority asset video frame.

A third operation of the producing of the first level of resolution of the virtual reality environment includes rendering another representation of the first set of object representations utilizing the first level of resolution to produce a first remaining portion of the video frames for the virtual reality environment with regards to the first set of object representations. For example, the experience creation module 30 renders another portion of the first set of object representations that was not included in the set of common illustrative assets.

A fourth operation includes rendering another representation of the second set of object representations utilizing the first level of resolution to produce a second remaining portion of the video frames for the virtual reality environment with regards to the second set of object representations. For example, the experience creation module 30 renders another portion of the second set of object representations that was not included in the set of common illustrative assets.

Having produced the first level resolution video frames, a fifth step of the example method of operation includes linking the common portion, the first remaining portion, and the second remaining portion of the video frames to produce a first level of resolution of the virtual reality environment. For example, the experience creation module aggregates in order the common portion of video frames, the first remaining portion of video frames, and the second remaining portion of the video frames to produce the first level of resolution of the virtual reality environment.

As another example, the experience creation module 30 creates a set of lesson assets 711 from the video frames and the preliminary set of lesson assets. For instance, the experience creation module 30 combines the preliminary set of lesson assets with the video frames of the common portion, the first remaining portion, and the second remaining portion to produce the set of lesson asset 711 as the virtual reality environment. Alternatively, or in addition to, the experience creation module 30 combines the preliminary set of lesson assets with the video frames to produce a lesson package 206 for storage in the learning assets database 34.

Having produced the first level of resolution of the virtual reality environment, the experience creation module 30 outputs a representation of the first level of resolution of the virtual reality environment to at least one of a learning asset database and a human interface module. For example, the experience creation module 30 outputs the lesson package 206 to the learning assets database 34 for storage where the lesson package 206 includes the first level resolution of the virtual reality environment. As another example, the experience creation module 30 outputs learner output information 170 to via the human interface module 18 as human output 162 for interactive consumption, where the learner output information 172 includes the first level resolution of the virtual reality environment.

FIG. 11C further illustrates the example method of operation of the generating of the multiple resolutions of the virtual reality environment, where, having produced, linked, and output the first resolution video frames, a sixth step of the example method of operation includes generating a second level of resolution of the virtual reality environment based on a priority asset 707 of the set of common illustrative assets. The second level of resolution is a higher video resolution level than the first level of resolution.

The sixth step includes determining the priority asset of the set of common illustrative assets. The determining the priority asset includes a series of sub-steps. A first sub-step includes determining a first importance status level of a first common illustrative asset of the set of common illustrative assets for example, the experience creation module 30 interprets modeled asset information 200 with regards to the piston object to reveal the first importance status level of the piston object.

A second sub-step includes comparing the first importance status level to the importance status threshold level with regards to the topic. For example, the experience creation module 30 interprets the modeled asset information 200 with regards to the topic to reveal the importance status threshold level with regards to the engine operation topic. The experience creation module 30 compares the importance status level of the piston to the importance status level threshold with regards to the engine topic.

A third sub-step includes establishing the first common illustrative asset as the priority asset when the first importance status level is greater than the importance status threshold level with regards to the topic. For example, the experience creation module 30 establishes the piston asset as the priority asset when the importance status level of the piston is greater than the importance status threshold level.

The sixth step of the example method of operation further includes the experience creation module 30 generating the second level of resolution of the virtual reality environment based on the priority asset of the set of common illustrative assets by a series of sub-steps. A first sub-step includes determining the priority asset 707 of the set of common illustrative assets as discussed above. The priority asset is associated with the importance status level that is greater than the importance status threshold level with regards to the topic.

A second sub-step includes rendering the priority asset utilizing the second level of resolution to produce a set of priority asset video frames 715. For example, the experience creation module 30 renders the object representation of the piston to produce the set of priority asset video frames that realize the higher second level of resolution.

A third sub-step includes selecting a subset of the set of priority asset video frames to produce an updated common portion of video frames for the virtual reality environment with regards to the first and second sets of object representations. For example, the experience execution module 32 selects video frames of the piston that are associated with improved learning when the higher resolution is utilized. For instance, when the fuel explodes in the cylinder above the piston during the power stroke to push the piston into the cylinder is an important aspect of the operation of the piston and the enhanced high-resolution of the second resolution level can help facilitate improved learning.

The sixth step of the example method of operation further includes the experience execution module 32 linking the updated common portion, the first remaining portion, and the second remaining portion of the video frames to produce the second level of resolution of the virtual reality environment. For example, the experience execution module 32 aggregates all the video frames to produce lesson asset video frames 713 as part of the lesson package 206.

Having produced the second level of resolution of the virtual reality environment, the experience execution module 32 outputs a representation of the second level of resolution of the virtual reality environment to at least one of the learning asset database and the human interface module. For example, the experience execution module 32 stores the lesson package 206 and the learning assets database 34, where the lesson package 206 includes the second level of resolution of the virtual reality environment. As another example, the experience execution module 32 outputs learner output information 170 to via the human interface module 18 as human output 162 for interactive consumption, where the learner output information 172 includes the second level of resolution of the virtual reality environment.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 12A, 12B, and 12C are schematic block diagrams of an embodiment of a computing system illustrating another example of updating a lesson package. The computing system includes the human interface module 18 of FIG. 1, the experience creation module 30 of FIG. 1, the learning assets database 34 FIG. 1, and the environment model database 16 of FIG. 1.

FIG. 12A illustrates an example method of operation of the updating of the lesson package where a first step includes the experience creation module 30 obtaining the lesson package for updating. For example, the experience creation module 30 recovers the lesson package 206 from the learning assets database 34. Alternatively, the experience creation module 30 generates the lesson package 206 as previously discussed. The lesson package 206 includes the set of lesson asset 711 as previously discussed. For example, the set of lesson asset 711 includes depictions of a four stroke internal combustion engine for each of the four strokes.

Having obtained the lesson package, a second step of the example method of operation of the updating the lesson package includes the experience creation module 30 determining a set of effectiveness information for aspects of the lesson package 206. For example, an effectiveness evaluation module 728 of the experience creation module 30 interprets learner input information 174 from the human interface module 18 to produce student population feedback. The human interface module 18 receives human input 164 that includes the student population feedback. The feedback includes student perceptions of effectiveness of the lesson package (e.g., overall, for portions).

Having produced the student population feedback, the effectiveness evaluation module 728 generates effectiveness information 730-1 through 730-4 for each of the four strokes of the four stroke engine lesson package based on the student population feedback. For example, the effectiveness evaluation module 728 produces the effectiveness information 730-1 for the intake stroke, where most students indicated that the instruction information and representative video frames effectively conveyed the operation of the engine during the intake stroke. As another example, the effectiveness evaluation module 728 produces the effectiveness information 730-3 for the power stroke, where most students indicated that the instruction information and representative video frames did not effectively convey the operation of the engine during the power stroke.

Alternatively, the second step of the example method of operation includes the effectiveness evaluation module 728 receiving environment sensor information 38 from the environment sensor module 14, where the environment sensor information 38 includes general population feedback with regards to effectiveness of the lesson package 206. In a similar fashion, the effectiveness evaluation module 728 evaluates the environment sensor information 38 to produce the effectiveness information 730-1 through 730-4.

FIG. 12B further illustrates the example method of operation for the updating of the lesson package where a third step includes the experience creation module 30 determining a set of effectiveness enhancements for the lesson package. For example, an effectiveness enhancement module 732 identifies objects of the lesson package for re-rendering that are associated with effectiveness information that is less than a minimum effectiveness threshold level. For instance, the experience creation module 30 identifies the piston object associated with the effectiveness information 730-2 through 730-4 as less than the minimum effectiveness threshold level.

Having identified the objects for re-rendering, a fourth step of the example method of operation includes the effectiveness enhancement module 732 utilizing modeled asset information 200 from the environment model database 16 to produce updated frames for the set of effectiveness enhancements to use second level frames for the piston associated with the second through fourth strokes based on the effectiveness information 730-1 through 730-4. For instance, the effectiveness enhancement module 732 produces no changes for the first stroke to produce enhancement information 734-1 and replaces video frames for the piston in the second through fourth strokes with the second level frames of the piston to produce enhancement information 734-2 through 734-4.

FIG. 12C further illustrates the example method of operation where a fifth step includes the experience creation module 30 integrating the updated frames for the set of effectiveness enhancements with the lesson package to produce an updated lesson package. For example, the experience creation module 30 uses the second level video frames (e.g., higher resolution and/or additional information frames) from the enhancement information 734-1 through 734-4 to replace corresponding frames of the lesson package to produce lesson asset video frames 713. Having produced the lesson asset video frames 713, the experience creation module 30 integrates the lesson asset video frames 713 with the lesson package 206 to produce the updated lesson package 206 for storage in the learning assets database 34.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 13A and 13B are schematic block diagrams of an embodiment of a computing system illustrating another example of updating a lesson package. The computing system includes the experience execution module 32 of FIG. 1, the learning assets database 34 FIG. 1, and the human interface module 18 of FIG. 1.

FIG. 13A illustrates an example method of operation of the updating of the lesson package that includes the experience execution module 32 determining lesson time frames for a set of party assets of a recovered lesson package along a lesson timeline 740. For example, the experience execution module 32 interprets the lesson package 206 to identify priority assets based on one or more of a predetermination, a user input, a major asset identification algorithm output, and an impact level metric. For example, the experience execution module 32 identifies a bulldozer a truck in a bridge as the set of party assets of the lesson package when each are associated with indicators of high-priority.

Having identified the priority assets, the experience execution module 32 identifies the lesson time frames for the set of priority assets. For example, the experience execution module 32 interprets video frames of the lesson package 206 to identify time codes associated with a portion of the lesson package associated with a first representation of each of the party assets. For example, the experience execution module 34 identifies a timecode of 0:10.0 associated with a first portrayal of the bulldozer, a timecode of 01:25.4 associated with a first portrayal of the truck, and a timecode of 3:03.1 associated with the first portrayal of the bridge.

Having determined the lesson time frames, a second step of the example method of operation to update the lesson package includes the experience execution module 32 generating a cue set for the set of party assets when initiating output of a rendered lesson. The cue set is associated with portrayal of each priority asset. The portrayal includes one or more of a small icon representing the party asset, words that represent the party asset, flashing/highlighting/color shifting etc. of a portion of a video rendering that ties to the priority asset, and including an icon for each priority asset alongside a video scrollbar of the video representation of the lesson package.

Having generated the cue set, the experience execution module 32 updates the lesson package 206 to include at least one representation of a cue of a priority asset for each priority asset to produce lesson asset video frames 713. For example, the experience execution module 32 generates the lesson asset video frames 713 to include small icons of the truck and bridge to be portrayed during a portion of the lesson package associated with the bulldozer. As another example, the experience execution module 32 generates the video scrollbar at to include time relative icons of the bulldozer in the bridge for another portion of the lesson package associated with the truck. As yet another example, the experience execution module 32 generates the lesson asset video frames 713 to include a blinking icon of the truck and a shadowed icon of the bulldozer for yet another portion of the lesson package associated with the bridge.

Having updated the lesson package 206, the experience execution module outputs learner output information 172 to the human interface module 18 where the learner output information 172 includes the lesson asset video frames 713. The human interface module 18 outputs human output 162 to a student, where the human output 162 includes the lesson asset video frames 713 such that the student can select one of the priority assets to facilitate immediately moving to the portion of the lesson package associated with that selected priority asset.

FIG. 13B further illustrates the example method of operation for the updating of the lesson package where the experience execution module 32 determines to jump the portrayal of the lesson package to a cue point associated with a selected priority asset along the lesson timeline 740. The selection of the party asset includes one or more of a user input selection, where a majority of students jump to now, where this particular student should jump to that is best for them based on one or more of their learning history and capability level. For example, while outputting lesson asset video frames 713 to the student via the human interface module 18 (e.g., outputting the learner output information 172 for representation by the human interface module 18 as human output 162) the portion of the lesson package associated with the bulldozer, the experience execution module 32 determines to jump to the portion associated with the truck based on interpreting learner input information 174 from the human interface module 18, where the student provided human input 164 to the human interface module 18 indicating to jump to the portion associated with the truck.

Having identified the cue point, a fourth step of the example method of operation of the updating of the lesson package includes the experience execution module 32 generating a portion of the lesson package associated with the cue point for output of the rendered lesson. For example, the experience execution module 32 outputs video frames of the lesson asset video frames 713 associated with the truck at cue point with the timecode of 01:25.4 as learner output information 172 2 the human interface module 18 for portrayal as human output 162 to the student. Alternatively, or in addition to, the experience execution module 32 changes the cue point representation method after jumping. For example, changing from small icons along the video scrollbar to flashing icons dropped onto a primary portion of the rendering.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 14A, 14B, and 14C are schematic block diagrams of an embodiment of a computing system illustrating another example of updating a lesson package. The computing system includes the experience execution module 32 of FIG. 1, the learning assets database 34 of FIG. 1, and the human interface module 18 of FIG. 1.

FIG. 14A illustrates an example method of operation of the updating of the lesson package that includes the experience execution module 32 generating learner-specific assessment assets for the lesson package. For example, instance experience module 290 of the experience execution module 32 generates a representation of a first set of learner-specific assessment assets of a first learning object of a plurality of learning objects 810 extracted from learning asset information 48 from the lesson package 206 recovered from the learning assets database 34. In assessment asset is utilized to portray a portion of an assessment. A learner-specific assessment asset conveys a portion of an assessment related to a specific student.

The first learning object includes a first set of knowledge bullet-points for a first piece of information regarding the topic. A second learning object of the plurality of learning objects includes a second set of knowledge bullet-points for a second piece of information regarding the topic. The first learning object and the second learning object further include an illustrative asset that depicts an aspect regarding the topic pertaining to the first and the second pieces of information, wherein the first learning object further includes a first descriptive asset regarding the first piece of information based on the first set of knowledge bullet-points and the illustrative asset.

The second learning object further includes a second descriptive asset regarding the second piece of information based on the second set of knowledge bullet-points and the illustrative asset.

The instance experience module 290 determines which learner-specific assessment assets to generate based on one or more of an identity of the student, a history of learning by the student, an estimated learning capability level of the student, and an expected comprehension level associated with the lesson package. For example, the instance experience module 290 selects the learner-specific assessment asset to include asking the student "what is the scoop?" of the DEE 6 bulldozer of the lesson package when an expected responses within an expected range of correctness for similar students.

Having selected the learner-specific assessment assets, a second step of the example method of operation to update the lesson package includes the instance experience module 290 outputting the learner-specific assessment assets. For example, the instance experience module 290 outputs assessment asset video frames 800 associated with the learner-specific assessment assets to the human interface module as learner output information 172. The human interface module 18 outputs human output 162 2 the student to include the assessment asset video frames 800 (e.g., a portrayal of the bulldozer asking what is the scoop?).

FIG. 14B further illustrates the example method of operation of the updating of the lesson package where a third step includes the experience execution module 32 obtaining an assessment response in response to the learner-specific assessment assets. For example, a learning assessment module 330 interprets learner input information 174 from the human interface module 18 to extract an assessment response 802, where the human interface module 18 receives human input 164 from the student that includes a response.

Having obtained the assessment response, a fourth step of the example method of operation includes the learning assessment module 330 determining an undesired performance aspect of the assessment response. For example, the learning assessment module 330 interprets the assessment response 802 to identify a first answer that includes a door of the bulldozer as the undesired performance aspect (e.g., the door not the scoop). As another example, the learning assessment module 330 interprets the assessment response 802 to identify a second answer that includes the actual scoop of the bulldozer as a desired performance aspect (e.g., the scoop as the correct answer).

FIG. 14C further illustrates the example method of operation where a fifth step includes the experience execution module 32 updating the learning objects to update the lesson package. The updating includes identifying a modification for the learning object to be updated based on the undesired performance aspect. For instance, when the student identified the door as the scoop incorrectly, the learning assessment module 330 determines the modification to include modifying a lesson package to further highlight the scoop of the bulldozer to make clear what portion of the bulldozer is the scoop and not the door.

Having identified the modification, the learning assessment module 330 re-renders a portion of the learning objects 810 to include the modification as updated learning objects 812. The learning assessment module 330 stores the updated learning objects 812 as the lesson package 206 in the learning assets database 34 to complete the updating of the lesson package.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples.

What is claimed is:

1. A method for creating a virtual reality environment regarding a topic, the method comprises:

generating, by a computing entity, the virtual reality environment utilizing a group of object representations in accordance with interaction information for at least some of the object representations of the group of object representations, wherein at least some of the object representations are associated with corresponding three dimensional (3-D) physical objects, wherein the interaction information includes 3-D models and position information for the at least some of the object representations of the group of object representations, wherein a first set of object representations of the group of object representations is associated with a first piece of information regarding the topic, wherein a second set of object representations of the group of object representations is associated with a second piece of information regarding the topic, wherein the generating the virtual reality environment includes:

identifying, by the computing entity, a set of common illustrative assets based on the first and second set of object representations, wherein the set of common illustrative assets belongs to the first and second sets of object representations and depict one or more aspects regarding the topic pertaining to the first and second pieces of information;

rendering, by the computing entity, the set of common illustrative assets utilizing a first level of resolution to produce a set of common illustrative assets video frames;

selecting, by the computing entity, a subset of the set of common illustrative assets video frames to produce a common portion of video frames for the virtual reality environment with regards to the first and second sets of object representations to reduce duplicative rendering, wherein the selecting the subset of the set of common illustrative assets video frames to produce the common portion of video frames includes:
   identifying a first priority asset video frame of the set of common illustrative assets video frames that represents a first aspect of the first set of object representations, identifying a second priority asset video frame of the set of priority asset video frames that represents a second aspect of the second set of object representations, and
   establishing the common portion of video frames to include the first priority asset video frame when more than a minimum threshold number of pixels of the first and second priority asset video frames are the same;
rendering, by the computing entity, another representation of the first set of object representations utilizing the first level of resolution to produce a first remaining portion of the video frames for the virtual reality environment with regards to the first set of object representations;
rendering, by the computing entity, another representation of the second set of object representations utilizing the first level of resolution to produce a second remaining portion of the video frames for the virtual reality environment with regards to the second set of object representations;
linking, by the computing entity, the common portion, the first remaining portion, and the second remaining portion of the video frames to produce a first level of resolution of the virtual reality environment;
determining a first importance status level of a first common illustrative asset of the set of common illustrative assets;
comparing the first importance status level to an importance status threshold level with regards to the topic;
establishing the first common illustrative asset as a priority asset when the first importance status level is greater than the importance status threshold level with regards to the topic; and
generating, by the computing entity, a second level of resolution of the virtual reality environment based on the priority asset of the set of common illustrative assets, wherein the second level of resolution is a higher video resolution level than the first level of resolution, wherein the generating the second level of resolution of the virtual reality environment based on the priority asset of the set of common illustrative assets includes:
   determining the priority asset of the set of common illustrative assets, wherein the priority asset is associated with an importance status level that is greater than an importance status threshold level with regards to the topic,
   rendering the priority asset utilizing the second level of resolution to produce a set of priority asset video frames,
   selecting a subset of the set of priority asset video frames to produce an updated common portion of video frames for the virtual reality environment with regards to the first and second sets of object representations, and
   linking the updated common portion, the first remaining portion, and the second remaining portion of the video frames to produce the second level of resolution of the virtual reality environment.

2. The method of claim 1 further comprises:
outputting, by the computing entity, a representation of the first level of resolution of the virtual reality environment to at least one of a learning asset database and a human interface module; and
outputting, by the computing entity, a representation of the second level of resolution of the virtual reality environment to at least one of the learning asset database and the human interface module.

3. The method of claim 1 further comprises:
determining, by the computing entity, the group of object representations by:
   interpreting a first set of knowledge bullet points of the topic to produce the first piece of information regarding the topic,
   obtaining the first set of object representations based on the first piece of information regarding the topic,
   interpreting a second set of knowledge bullet points of the topic to produce the second piece of information regarding the topic, and
   obtaining the second set of object representations based on the second piece of information regarding the topic.

4. A computing device comprises:
an interface;
a local memory; and
a processor operably coupled to the interface and the local memory, wherein the local memory stores operational instructions that, when executed by the processor, causes the computing device to:
   generate a virtual reality environment utilizing a group of object representations in accordance with interaction information for at least some of the object representations of the group of object representations, wherein at least some of the object representations are associated with corresponding three dimensional (3-D) physical objects, wherein the interaction information includes 3-D models and position information for the at least some of the object representations of the group of object representations, wherein a first set of object representations of the group of object representations is associated with a first piece of information regarding a topic, wherein a second set of object representations of the group of object representations is associated with a second piece of information regarding the topic, wherein processor generates the virtual reality environment by:
   identifying a set of common illustrative assets based on the first and second set of object representations, wherein the set of common illustrative assets belongs to the first and second sets of object representations and depict one or more aspects regarding the topic pertaining to the first and second pieces of information;
   rendering the set of common illustrative assets utilizing a first level of resolution to produce a set of common illustrative assets video frames;
   selecting a subset of the set of common illustrative assets video frames to produce a common portion of video frames for the virtual reality environment with regards to the first and second sets of object representations to reduce duplicative rendering, wherein the selecting the subset of the set of common illustrative assets video frames to produce the common portion of video frames includes:
  identifying a first priority asset video frame of the set of common illustrative assets video frames that represents a first aspect of the first set of object representations,
  identifying a second priority asset video frame of the set of priority asset video frames that represents a second aspect of the second set of object representations, and
  establishing the common portion of video frames to include the first priority asset video frame when more than a minimum threshold number of pixels of the first and second priority asset video frames are the same;
rendering another representation of the first set of object representations utilizing the first level of resolution to produce a first remaining portion of the video frames for the virtual reality environment with regards to the first set of object representations;
rendering another representation of the second set of object representations utilizing the first level of resolution to produce a second remaining portion of the video frames for the virtual reality environment with regards to the second set of object representations;
linking the common portion, the first remaining portion, and the second remaining portion of the video frames to produce a first level of resolution of the virtual reality environment;
determining a first importance status level of a first common illustrative asset of the set of common illustrative assets;
comparing the first importance status level to an importance status threshold level with regards to the topic;
establishing the first common illustrative asset as a priority asset when the first importance status level is greater than the importance status threshold level with regards to the topic; and
generating a second level of resolution of the virtual reality environment based on the priority asset of the set of common illustrative assets, wherein the second level of resolution is a higher video resolution level than the first level of resolution, wherein the generating the second level of resolution of the virtual reality environment based on the priority asset of the set of common illustrative assets includes:
  determining the priority asset of the set of common illustrative assets, wherein the priority asset is associated with an importance status level that is greater than an importance status threshold level with regards to the topic, rendering the priority asset utilizing the second level of resolution to produce a set of priority asset video frames,
  selecting a subset of the set of priority asset video frames to produce an updated common portion of video frames for the virtual reality environment with regards to the first and second sets of object representations, and
  linking the updated common portion, the first remaining portion, and the second remaining portion of the video frames to produce the second level of resolution of the virtual reality environment.

5. The computing device of claim 4, wherein the processor processing further functions to:
  output, via the interface, a representation of the first level of resolution of the virtual reality environment to at least one of a learning asset database and a human interface module; and
  output, via the interface, a representation of the second level of resolution of the virtual reality environment to at least one of the learning asset database and the human interface module.

6. The computing device of claim 4, wherein the processor processing further functions to:
  determine the group of object representations by:
    interpreting a first set of knowledge bullet points of the topic to produce the first piece of information regarding the topic,
    obtaining, via the interface, the first set of object representations based on the first piece of information regarding the topic,
    interpreting a second set of knowledge bullet points of the topic to produce the second piece of information regarding the topic, and
    obtaining, via the interface, the second set of object representations based on the second piece of information regarding the topic.

7. A non-transitory computer readable memory comprises:
  a first memory element that stores operational instructions that, when executed by a processor, causes the processor to:
    generate a virtual reality environment utilizing a group of object representations in accordance with interaction information for at least some of the object representations of the group of object representations, wherein at least some of the object representations are associated with corresponding three dimensional (3-D) physical objects, wherein the interaction information includes 3-D models and position information for the at least some of the object representations of the group of object representations, wherein a first set of object representations of the group of object representations is associated with a first piece of information regarding a topic, wherein a second set of object representations of the group of object representations is associated with a second piece of information regarding the topic, wherein processor generates the virtual reality environment by:
      identifying a set of common illustrative assets based on the first and second set of object representations, wherein the set of common illustrative assets belongs to the first and second sets of object representations and depict one or more aspects regarding the topic pertaining to the first and second pieces of information;
  a second memory element that stores operational instructions that, when executed by the processor, causes the processor to further generate the virtual reality environment by:
    rendering the set of common illustrative assets utilizing a first level of resolution to produce a set of common illustrative assets video frames;
    selecting a subset of the set of common illustrative assets video frames to produce a common portion of video frames for the virtual reality environment with regards to the first and second sets of object representations to reduce duplicative rendering, wherein the selecting the subset of the set of common illustrative assets video frames to produce the common portion of video frames includes:
- identifying a first priority asset video frame of the set of common illustrative assets video frames that represents a first aspect of the first set of object representations,
- identifying a second priority asset video frame of the set of priority asset video frames that represents a second aspect of the second set of object representations, and
- establishing the common portion of video frames to include the first priority asset video frame when more than a minimum threshold number of pixels of the first and second priority asset video frames are the same;

rendering another representation of the first set of object representations utilizing the first level of resolution to produce a first remaining portion of the video frames for the virtual reality environment with regards to the first set of object representations; and rendering another representation of the second set of object representations utilizing the first level of resolution to produce a second remaining portion of the video frames for the virtual reality environment with regards to the second set of object representations; and a third memory element that stores operational instructions that, when executed by the processor, causes the processor to further generate the virtual reality environment by:
- linking the common portion, the first remaining portion, and the second remaining portion of the video frames to produce a first level of resolution of the virtual reality environment;
- determining a first importance status level of a first common illustrative asset of the set of common illustrative assets;
- comparing the first importance status level to an importance status threshold level with regards to the topic;
- establishing the first common illustrative asset as a priority asset when the first importance status level is greater than the importance status threshold level with regards to the topic; and
- generating a second level of resolution of the virtual reality environment based on the priority asset of the set of common illustrative assets, wherein the second level of resolution is a higher video resolution level than the first level of resolution, wherein the generating the second level of resolution of the virtual reality environment based on the priority asset of the set of common illustrative assets includes:
  - determining the priority asset of the set of common illustrative assets, wherein the priority asset is associated with an importance status level that is greater than an importance status threshold level with regards to the topic,
  - rendering the priority asset utilizing the second level of resolution to produce a set of priority asset video frames,
  - selecting a subset of the set of priority asset video frames to produce an updated common portion of video frames for the virtual reality environment with regards to the first and second sets of object representations, and
  - linking the updated common portion, the first remaining portion, and the second remaining portion of the video frames to produce the second level of resolution of the virtual reality environment.

8. The non-transitory computer readable memory of claim 7 further comprises:
a fourth memory element stores operational instructions that, when executed by the processor, causes the processor to:
output a representation of the first level of resolution of the virtual reality environment to at least one of a learning asset database and a human interface module; and
output a representation of the second level of resolution of the virtual reality environment to at least one of the learning asset database and the human interface module.

9. The non-transitory computer readable memory of claim 7 further comprises:
a fifth memory element stores operational instructions that, when executed by the processor, causes the processor to:
determine the group of object representations by:
- interpreting a first set of knowledge bullet points of the topic to produce the first piece of information regarding the topic,
- obtaining the first set of object representations based on the first piece of information regarding the topic,
- interpreting a second set of knowledge bullet points of the topic to produce the second piece of information regarding the topic, and
- obtaining the second set of object representations based on the second piece of information regarding the topic.

* * * * *